United States Patent
Sunarno et al.

(10) Patent No.: US 10,275,225 B1
(45) Date of Patent: Apr. 30, 2019

(54) IMPLICIT VALUE STORE MAPPING

(71) Applicant: Amazon Technologies, Inc., Seattle, WA (US)

(72) Inventors: Ronald Widharta Sunarno, New York, NY (US); Pierre Steckmeyer, New York, NY (US); David Ping, Fort Lee, NJ (US); Nicolas Vautier, Weehawken, NJ (US); Umesh Haridas Sampat, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/587,105

(22) Filed: May 4, 2017

(51) Int. Cl.
  *G06F 9/44* (2018.01)
  *G06F 8/30* (2018.01)
  *G06F 8/71* (2018.01)

(52) U.S. Cl.
  CPC . *G06F 8/31* (2013.01); *G06F 8/71* (2013.01)

(58) Field of Classification Search
  CPC ............... G06F 8/30; G06F 8/20; G06F 8/36
  USPC ........................................................ 717/106
  See application file for complete search history.

(56) References Cited

U.S. PATENT DOCUMENTS

| | | |
|---|---|---|
| 6,637,025 B1 | 10/2003 | Beadle et al. |
| 8,453,143 B2 | 5/2013 | Mahalingam et al. |
| 2005/0268225 A1* | 12/2005 | Pelegri-Llopart ......... G06F 8/31 715/255 |
| 2006/0149731 A1 | 7/2006 | Schirmer et al. |
| 2009/0125546 A1* | 5/2009 | Iborra ....................... G06F 8/30 |
| 2012/0222003 A1 | 8/2012 | Shukla et al. |
| 2015/0317156 A1* | 11/2015 | Chan ........................ G06F 8/73 717/123 |
| 2016/0103699 A1 | 4/2016 | Thakkar et al. |

* cited by examiner

*Primary Examiner* — John Q Chavis
(74) *Attorney, Agent, or Firm* — Davis Wright Tremaine LLP

(57) ABSTRACT

A variable is identified. Information associated with the variable is identified. A distributed resource for storing a value for the variable is identified based at least in part on the information. The distributed resource for storing the value is automatically provisioned.

20 Claims, 10 Drawing Sheets

IMPLICIT VALUE STORE MAPPING

BACKGROUND

Customers seeking to host and execute applications and web services often utilize networks of computers and storage resources provided by computing resource service providers. However, it becomes challenging for a developer to design computer applications in such a way as to minimize latency and optimize scalability when deployed to distributed systems such as by having to explicitly code different implementations for in-memory transient storage, out-of-process transient storage, and out-of-process persistent storage. Furthermore, in determining a backend resource for shared data storage, a developer often must manually include shared resource identifier information such that all components within the distributed system can locate the shared storage. Moreover, the developer often must also manually provide details on how each subsystem coordinates work such that the shared storage is never in an invalid state.

BRIEF DESCRIPTION OF THE DRAWINGS

Various techniques will be described with reference to the drawings, in which.

DETAILED DESCRIPTION

Figure 1:
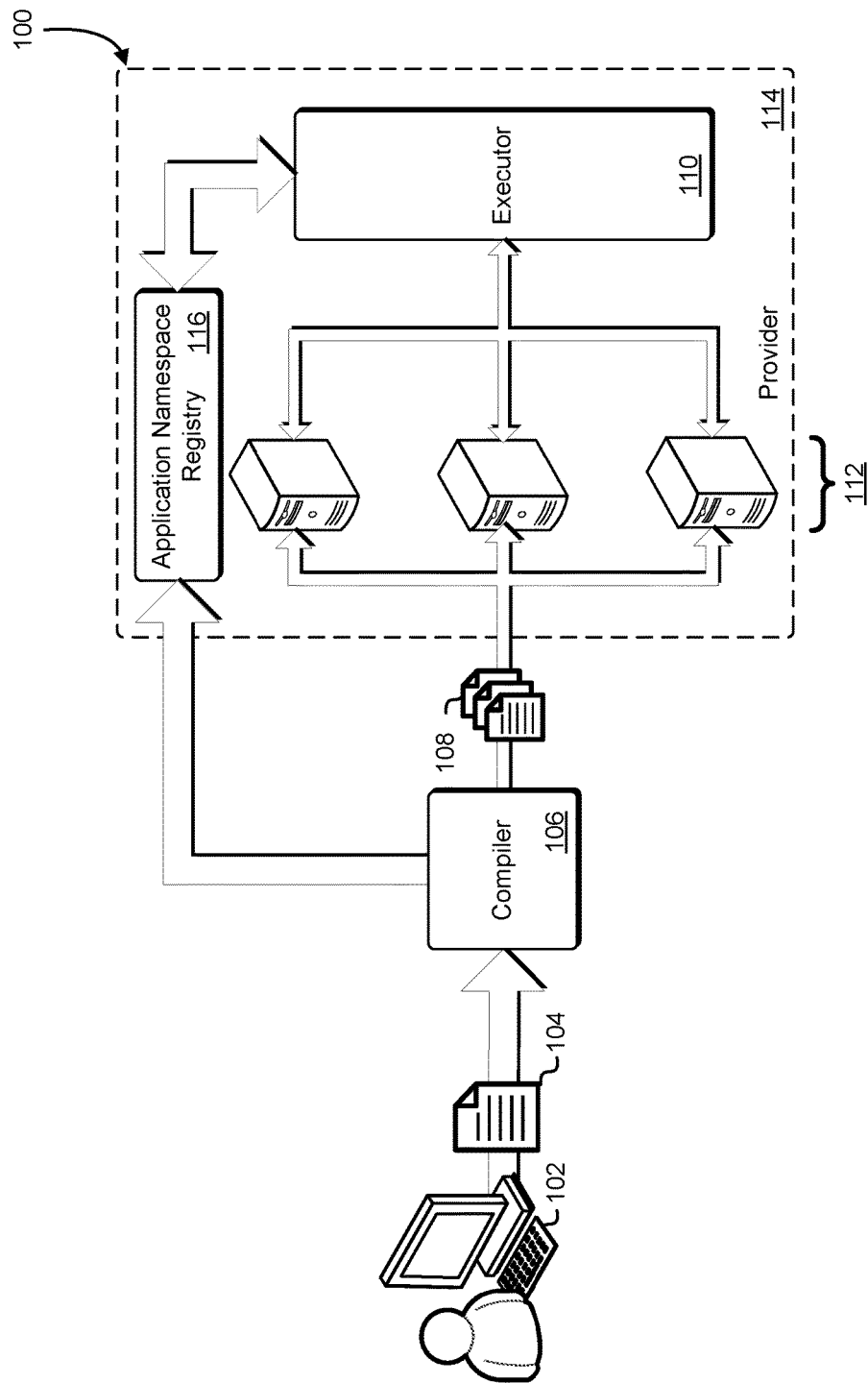
FIG. 1 illustrates an example of a system for implementing implicit value storage in accordance with one embodiment.

Techniques and systems described below relate to a shared store for variable storage for a distributed application. In one embodiment, a software developer declares shared store preferences, such as accessibility scope, concurrency, and data consistency preferences, within source code for an application that executes different components within a distributed system. In one embodiment, the appropriate storage resources for storing the variables are determined based at least in part on the declared preferences, and the appropriate computer-executable instructions for accessing the variables are determined by a source code compiler and executor. In one embodiment, techniques include evaluating source code to identify a variable and then identifying information associated with the variable.

In one embodiment, the information can include, without limitation, information such as the data type of the variable, the lexical scope desired for the variable by the developer, the concurrency conditions (e.g., whether multiple threads can perform simultaneous writes to the variable) desired for the variable by the developer, and the consistency (e.g., whether the variable is to be a constant, is to be strongly consistent, or is to be eventually consistent) conditions desired for the variable by the developer. In one embodiment, based at least in part on the information, the system of the present disclosure identifies a resource, such as a local resource (e.g., local memory stack) or a distributed resource (e.g., distributed database, distributed queue service, distributed in-memory cache service, etc.), for storing a value for the variable. In one embodiment, as a result of execution of the compiled computer-executable instructions, the system is caused to automatically provision the distributed resource for storing the value of the variable.

In the preceding and following description, various techniques are described. For purposes of explanation, specific configurations and details are set forth in order to provide a thorough understanding of possible ways of implementing the techniques. However, it will also be apparent that the embodiments described below may be practiced in different configurations without the specific details. Furthermore, in the descriptions of the embodiments, well-known features may be omitted or simplified to avoid obscuring the techniques being described.

Techniques described and suggested in the present disclosure improve the field of computing, specifically the field of software development, by dynamically determining persistent storage resources for storing application variables and enabling software developers to utilize the storage resources without having to first learn commands specific to the underlying technologies of the storage resources. Additionally, techniques described and suggested in the present disclosure improve the functioning of distributed computing systems by allowing different functions or deployment packages of a single application to execute on multiple computing devices while sharing access to the same object-wide and application-wide variables. Moreover, techniques described and suggested in the present disclosure are necessarily rooted in computer technology in order to overcome problems specifically arising with distributed computing systems by enabling variable sharing and automatic storage resource allocation without requiring developers to support the specific storage resources in application source code.

FIG. 1 illustrates an environment 100 in which one embodiment is to be practiced. FIG. 1 illustrates the environment as including a client 102 that submits application source code 104 to a compiler 106, which evaluates the source code 104 to register appropriate storage resources for storing variable values with an application namespace registry 116 and compiles the source code 104 into a set of computer-executable instructions 108. FIG. 1 further illustrates that hosts 112 provided by a computing resource service provider 114 execute the set of computer-executable instructions 108, and as a result of execution, the hosts 112 communicate with an executor 110 to access the variable values. FIG. 1 illustrates that the executor 110 communicates with the application namespace registry 116 to determine the appropriate storage resources for accessing the variable values.

In one embodiment, the client 102 is embodied as a physical device associated with a user and/or customer of the computing resource service provider 114 and is able to send and/or receive requests, messages, or information over an appropriate network. Client devices include, without limitation, personal computers, cellular telephones, handheld messaging devices, laptop computers, tablet computing devices, set-top boxes, personal data assistants, embedded computer systems, electronic book readers, and the like, such as the electronic client device 902 described in conjunction with FIG. 9.

In one embodiment, the computing resource service provider 114 provides one or more computing resource services to its customers individually or as a combination of services of a distributed computer system. In one embodiment, one or more computing resource services of the computing resource service provider is accessible over a network and can include, without limitation, virtual computer system services, block-level data storage services, cryptography services, on-demand data storage services, notification services, authentication services, policy management services, task services, and/or other such services. Not all embodiments described include all of the services described, and, in one embodiment, additional services are provided in addition to or as an alternative to services explicitly described.

In one embodiment, customers of the computing resource service provider 114 communicate with one or more of the services via an interface. In one embodiment the interface is a web services interface or, in other embodiments, another type of customer interface. In one embodiment, each service provided by the computing resource service provider 114 has its own interface, and subsets of the services have corresponding individual interfaces in addition to or as an alternative to a common interface. In one embodiment, a customer of the computing resource service provider 114 communicates with the computing resource service provider through a network whereby the network, in one embodiment, is a communication network. In one embodiment, a communication network can include, without limitation, the Internet, an intranet, an Internet service provider (ISP) network and/or some other such network as described below.

In one embodiment, the source code 104 is a collection of computer instructions written in a human-readable programming language by a software developer. In one embodiment, the source code 104 is transformed by an assembler or the compiler 106 into a set of computer-executable instructions 108 executable by a computing device. In one embodiment, the set of computer-executable instructions 108 may comprise a software application. In the present disclosure, the source code is written using a syntax for specifying constraints on variables from which the compiler 106 can determine backend resources for variable storage. In one embodiment, a "software application" refers to a computer program designed to perform a group of coordinated functions, tasks, or activities. In one embodiment, the source code 104 includes logical grouping of one or more classes or functions. In one embodiment, the source code 104 includes notations by the software developer to designate a desired proximity of execution between program methods upon deployment (e.g., in a distributed system) based on latency requirements (also referred to herein as "latency notation" or "best-effort" invocation). In one embodiment, proximity of execution refers to an amount of physical or virtual separation between threads executing functions; e.g., in one embodiment, two functions being executed by the same thread are considered in close proximity, whereas two functions being executed on separate physical computing devices connected by a network would be considered in remote/distant proximity to each other. In one embodiment, placement of the executable packages comprising the software application can be distributed within the same thread, where low-latency is desired, or among different network-separated hosts, where horizontal scalability is prioritized. In one embodiment, the notation discriminates between "low-latency" and "best-effort."

In one embodiment, distribution of the software packages comprising the software application in this manner is a technique for optimizing host utilization, latency, and throughput by establishing criteria for determining when the system will incorporate additional physical hosts, instantiate additional virtual hosts or containers on existing physical hosts, create additional thread pools on existing virtual hosts or containers, or create additional threads on existing thread pools. In one embodiment, the package clustering strategy takes into consideration the number and size of physical hosts available, the number of virtual hosts or containers available on each physical host, the available processors and memory, and the customer's budget. In one embodiment, a clustering strategy begins with the use of uniformly sized virtual hosts or containers on physical servers where the number of virtual hosts or containers instantiated is based on the capacity of the physical server. In such embodiments, the first packages might be evenly distributed across the available virtual hosts or containers on one or more physical servers.

In one embodiment, the compiler 106 is one or more computer programs designed to transform the source code 104 into the set of computer-executable instructions 108. In one embodiment, the compiler 106 parses the source code 104, written in a high-level programming language (e.g., C#, C++, Java, etc.) by a software developer, into a lower-level language (e.g., assembly language, machine code, etc.) that can be executed by the hosts 112. In one embodiment, the compiler 106 identifies (e.g., by parsing the source code 104) variables' lexical scope (also referred to herein as "accessibility scope"). In one embodiment, "lexical scope" refers to a scope of accessibility of the variable. In one embodiment, the compiler 106 determines the lexical scope of a variable based on the lexical context of the variable (e.g., the location in the source code where the named variable or data object is declared/defined). In one embodiment, at least three lexical scope levels are contemplated: (1) function-wide, (2) object-wide, and (3) application-wide.

In one embodiment, a variable having function-wide lexical scope is local to the scope of the function's execution call stack and thus only persisted for the lifetime of the call stack. In one embodiment, a variable, "foo," with function-wide lexical scope is shown below:

go( ) { var foo="bar"

print(foo) // bar

}

In one embodiment, "print(foo)" results in the output of "bar." An attempt to access "foo" from outside the function "go( )" results in an error:

//outside go( )

print(foo) // error

In one embodiment, a variable having object-wide lexical scope is similar to a class member variable. That is, in one embodiment a variable with object-wide lexical scope is persisted for the lifetime of an object (e.g., instance of a class) in which the variable was declared. In one embodiment, a variable, "foo," with object-wide lexical scope is shown below:

```
class main {
var foo="bar"
main( ) {
   this.go1( )
   .then(this.go2( ))
}
go1( ) {
   print(this.foo) // bar
   foo="boo"
}
go2 ( ) {
   print (this.foo) // boo
}
}
```

As can be seen above, the variable "foo" is set equal to "bar" with object-wide lexical scope in the class "main." Execution of the function "main( )" causes the function "go1( )" to be called which performs a "print(foo)," which results in an output of "bar." The function "go1( )" then sets "foo" equal to "boo" and calls the function "go2( )" The function "go2( )" performs a "print(foo)," which, because the variable "foo" has object-wide lexical scope, and is accessible to/shared by both "go1( )" and "go2( )" results in an output of "boo." Likewise, when the function call returns to "main( )" the function "go2( )" is again called and results in an output of "boo." However, an attempt to access "foo" from outside the class "main" results in an error:

//outside main class
print(foo) // error

In one embodiment, a variable having application-wide lexical scope is an application-wide global variable accessible from different classes and functions of the application. In one embodiment, a variable, "foo," with application-wide lexical scope is shown below:

```
static class persistence {
static var foo="bar" // stored into a platform-managed
   database
}
class main {
go( ) {
   print(persistence.foo) // fetched from a platform-man-
      aged database
}
}
```

In the preceding paragraph, the static variable, "foo," is declared within a static class "persistence," which typically has a normal lifetime that extends until the software application is exited. Execution of the application, within the static class "persistence," causes the variable "foo" to be set equal to "bar." Execution of the "main" class of the application results in the function "go( )" being called, which itself performs a "print(persistence.foo)," which results in an output of "bar." In one embodiment, the value of an application-wide variable is persisted in the application namespace registry 116 for the lifetime of the application. In the case of a typical web application, in one embodiment, this potentially application-wide value is persisted until the web application is decommissioned (e.g., due to liquidation/closure of business) or the corresponding value is explicitly deleted as part of a transaction. In one embodiment, during a variable's disposal/garbage collection, the stored value in the storage resource is left unmodified and discarded on an explicit delete or when the application is deleted from the application namespace registry.

In one embodiment, the compiler 106 additionally or alternatively identifies (e.g., by parsing the source code 104) a variable's concurrency requirement. In one embodiment, "concurrency requirement" (also referred to herein as a "concurrency condition" or "concurrent access condition") refers to a limit on simultaneous access to a variable. That is, in one embodiment, it is determinable from the source code whether the variable is to be under mutual exclusion control or not. In one embodiment, at least two concurrency conditions are contemplated: (1) shared value, and (2) exclusive access. In one embodiment, an exclusive access variable can be distinguished from a shared value variable in the declaration syntax (e.g., the word "synchronized"). In one embodiment, an exclusive access variable and a shared value variable appear below:

var foo1="bar" // allow concurrent reads and writes
   synchronized var foo2="bar" // allow concurrent reads
   and single writes. Concurrent writes throws safety
   violation exception In the above paragraph, as implemented in one embodiment of the present disclosure, the variable "foo1," if shared between concurrent threads, can be modified freely by the concurrently executing threads. On the other hand, the variable "foo2," which is declared to have exclusive access (by the keyword "synchronized"), can be read freely by the concurrently executing threads, but writes are mutually exclusive; that is, an attempt by a second thread to write to "foo2" while a first thread is writing to "foo2" will cause an exception to be thrown. Note that in one embodiment, declaring the variable "foo1" without a keyword defaults to shared concurrency; however, it is contemplated that in one embodiment, shared concurrency can be indicated using a keyword (e.g., "shared") preceding the declaration or by some other indication in the syntax of the source code 104.

In one embodiment, if the compiler 106 determines that a variable is to be shared (e.g., by parsing the syntax to identify that the variable is not exclusive access), the compiler 106 can utilize this information at least in part to determine that a shared value store should be used for storage of the variable value. In one embodiment, the compiler 106 would consequently generate a set of computer-executable instructions for initializing and/or provisioning the determined shared value store, and commands accessing the variable (e.g., reading, writing, etc.) in the source code would be transformed into a corresponding set of computer-executable instructions for the determined shared value store (e.g., structured query language (SQL) commands ("SELECT value FROM db1 WHERE name='foo'," "UPDATE db1 SET value='bar' WHERE name='foo'," etc.)). In this embodiment, a shared value store would allow multiple threads of the application to access the value of the variable from the shared value store without locking requirements.

In one embodiment, if the compiler 106 determines that a variable is to have the property of exclusive access, the compiler 106 can utilize this information at least in part to determine that a storage resource for the variable should have "locking" support (i.e., supports the ability to lock the variable value from being modified simultaneously by multiple threads). In one embodiment, the prefix "synchronized" provides this concurrency indication that only one thread should be able to write to the variable at any given point in time; concurrent writes will cause an exception to be thrown. In this manner, in one embodiment, the built-in concurrency features of the storage resource (e.g., database engine) selected by the compiler 106 automatically enforce synchronized writes to the variable without further coding by the software developer.

In one embodiment, the compiler 106 additionally or alternatively identifies (e.g., by parsing the source code 104)

a variable's consistency requirement. In one embodiment, "consistency requirement" (also referred to as a "data consistency condition") refers to the strength of a guarantee that a modification to a value will converge to that value. In one embodiment, at least three data consistency conditions are contemplated: (1) constant/read-only; (2) strongly consistent read; and (3) eventual consistent read. In one embodiment, data consistency conditions can be determined by the manner in which a read operation is coded within the source code (e.g., keyword "const," "peek" call, etc.). Example usage of a constant/read-only consistency requirement is shown below:

const foo1="bar" // (1) Constant/Read-only
    foo1="bar2" // throws violation exception As seen above, the keyword "const" in the declaration of "foo1" is an indication by the software developer that the variable "foo1" is to be a constant/read-only value, and that value is to be "bar." In one embodiment, an attempt to modify the value of "foo1" will cause the system to throw an exception. In contrast, usage of a strongly consistent read is shown below:

First Thread:
    var foo2="bar"
    print(foo2)
    foo2="boo"
    Second Thread:
    print(foo2)

In the above example, the variable "foo2" is declared without a particular keyword and is initially set equal to "bar." The variable "foo2" can subsequently be modified (e.g., set equal to "boo"). In the above example, the command "print(foo2)," in one embodiment, indicates a strongly consistent read, and consequently the output of "print(foo2)" of the second thread will reflect the most recent modification ("boo") of the variable "foo2"; in a distributed system, if the modified value of the variable is being replicated to the distributed systems, in one embodiment, the output of the second thread will reflect the modified value once the second thread has access to the modified value. In other words, for a strongly consistent read, all pending writes are executed before the strongly consistent read is performed. Based on the variable declaration of "foo2" without a particular keyword, such as "const" and the context of use (e.g., "print (foo2)"), the compiler 106, in one embodiment, determines a storage resource for the variable with built-in support for a strongly consistent read in this manner. In contrast, usage of an eventually consistent read is shown below:

First Thread:
    var foo2="bar"
    print(foo2)
    foo2="boo"
    Second Thread:
    // Before fetching the value
    print(foo2.peek( ))

In the above paragraph, the call to "peek( )" causes the second thread to fetch the value of "foo2" in the state that is currently accessible to the second thread. That is if the modified value ("boo") has not yet been replicated to be accessible by the second thread, "print(foo2.peek( )" results in an output of "bar." On the other hand, if the modified value has been replicated to be accessible by the second thread, "print(foo2.peek( )" results in an output of "boo." In other words, the call to "peek( )" causes the thread to not wait for pending writes to be executed before fetching the value. Thus, in one embodiment, based on the variable declaration of "foo2" without a particular keyword, such as "const" and the context of use (e.g., "print(foo2.peek( )"), the compiler 106 determines that the storage resource to be provisioned for storage of the variable should have support for an eventually consistent read in this manner.

In one embodiment, the set of computer-executable instructions 108 comprises the output of the compiler 106. In one embodiment, the set of computer-executable instructions 108 is stored in persistent storage (e.g., a file system, database, etc.). In these or other embodiments, the set of computer-executable instructions 108 can be temporarily stored (e.g., in memory, cache, etc.) such that the computer-executable instructions can be deployed quickly, such as in response to a deployment request from a customer, in response to a deployment request from a computing device under the control of the customer, or in response to a deployment request from an entity authorized by the customer to deploy the set of computer-executable instructions 108 in the hosts 112 associated with an account of the customer, or through the use of a scheduling system.

In one embodiment, the executor 110 is one or more computer programs designed to execute functions running on the hosts 112, coordinate shared memory space between application components of the software application executing on the hosts 112, and ensure access privileges between the functions or deployment packages and other components of the software application executing on the host 112. In one embodiment, a deployment package (also referred to as a software package) is a computer file that includes one or more functions of a software application. The deployment package, in one embodiment, is a member of one or more deployment packages that, upon deployment to one or more computing devices, comprise the software application. In one embodiment, the executor 110 executes as a separate process on each of the hosts 112. In other embodiments, the executor 110 executes within a hypervisor that manages a plurality of the hosts 112. In still other embodiments, the executor executes as a separate process on a separate computing device from the hosts 112.

In one embodiment, the hosts 112 represent one or more of different threads, different thread pools, different containers, different virtual machines on the same physical server, virtual machines on different physical servers, different physical servers, or any combination of the above. In one embodiment, virtual machines can support multiple thread pools. In one embodiment, a customer of the computing resource service provider 114 has a software application that the customer desires to run on the hosts 112. In one embodiment, security roles and policies associated with the customer allow the customer, or authorized entities on behalf of the customer, to make requests through a computing device (e.g., the client 102) to cause various administrative functions (e.g., launching the application on the hosts 112) to be performed by the computing resource service provider 114.

In one embodiment, during execution of the set of computer-executable instructions 108 by the host 112, the executor 110 receives calls to access the values of variables specified in the set of computer-executable instructions. In one embodiment, the executor 110 accesses the application namespace registry 116 to determine the resource type and resource for storing the variables.

Note that in many imperative object-oriented programming languages, "dot" (.) notation indicates the invocation of a program method (callee) within the set of computer-executable instructions 108 by a calling routine (caller); e.g., "object.method( )" Invocation of a called program method generally occurs within the caller's processing thread. Although invocation within the same thread minimizes the time (latency) between calls, in one embodiment, invocation requires both the caller and callee to run on the same processor and restricts application scalability. The present disclosure contemplates the additional concept of "best-effort" program method invocation and its application through the use of "latency notation," whereby a developer can specify that a program method be invoked in a manner other than in-thread (or in-process).

In one embodiment, a program method within the set of computer-executable instructions 108 can be invoked to run within the same thread pool, a separate thread pool within the same virtual machine, or on separate virtual machines, as represented by the hosts 112. In one embodiment, a virtual machine refers to one of a plurality of virtualized computing devices potentially able to run on a single physical server. In one embodiment, "container" (also referred to as "software container"), refers to a lightweight, virtualized instance running under an operating system. Thus, in one embodiment, the program method could be invoked to run within a separate container. In such an embodiment, the hosts 112 represent separate containers. In one embodiment, systems for managing containers include, without limitation, the Docker container engine and the CoreOS Rocket container engine.

In one embodiment, the program method could be invoked to run on a separate physical host, possibly within a virtual machine running under a hypervisor on that separate physical host. Note, however, in one embodiment, that the more removed the invoked program method is from the consuming thread, the greater the latency is likely to be between the caller and callee (e.g., invoking the program method on a separate physical host introduces latency due to network overhead). In one embodiment, best-effort invocation presents the ability to distribute executable components of a software application across multiple computing resources. In the present disclosure, best-effort invocation is indicated by the latency notation "arrow" (>) to express an intent to invoke a program method that may, but is not required to, execute within the invoker's thread; e.g., "object>method( )" The "arrow" notation allows a developer to specify that the computing resource service provider is allowed to invoke the program method in another thread or even on another physical computing device. In one embodiment, the application namespace registry 116 is a storage repository that holds records of metadata about variables and/or other components of a software application.

During compilation, the compiler 106, in one embodiment, determines/identifies the storage resources appropriate for storing variable values based on a set of parameters that may include, but not be limited to, the latency scope, the concurrency conditions, and the consistency conditions described above. In one embodiment, the compiler 106 further takes into account the data type of the variable in the determination of the appropriate storage resource. That is, in such embodiments, collections and other data structures could merit different considerations in determining the resources for storage of the collection or other data structure. In one embodiment of the present disclosure, the compiler 106 distinguishes between at least four collection types during consideration of which storage resource to map/assign to the collection type: (1) array, (2) linked list, (3) hash table, (4) and dictionary (also referred to as a "map," an "associative array," or "symbol table." In one embodiment, an array is a data type for holding collections of values that can be selected by one or more indices. A declaration of an array in a manner described in the present disclosure is shown below:

synchronized var Person[ ]=new Person ( ) {name: "Ron" }

In one embodiment, with the concurrency indicated as "synchronized" and the data type being an array of type "Person( )" (as indicated by "Person[ ]=new Person ( ) {name: 'Ron'}," the compiler 106 determines to store the array variable "Person[ ]" in platform-managed persistence storage with a random internal globally unique identifier (GUID) as the key. The square brackets ("[ ]") indicate that multiple "persons" can be stored in the collection and the keyword "synchronized" indicates that the array is to be modified by only one thread at a time. The notation "name: 'Ron'" is further analogous to inserting a record into a "person" table in a database. Thus, in one embodiment, the compiler 106 may determine, based on parsing these notations, that a database table should be provisioned for storage of the "Person[ ]" array. Note that it is contemplated that, in one embodiment, other notations/syntax are usable to indicate these features.

In one embodiment, a linked list is a linear collection of values linked to each other in a sequence by pointers. In one embodiment, linked lists include, without limitation, stacks (last in, first out (LIFO)) and queues (first in, first out (FIFO)). In one embodiment, declaration and use of a linked list in a manner described in the present disclosure is shown below:

synchronized LinkedList People=new LinkedList( )
People.push(new Person( ) {name: "Ron"})
People.pop( )

In one embodiment, with the concurrency indicated as "synchronized" and the data type being of type "LinkedList," the compiler 106 determines to store the linked list in a platform-managed persistence that provides guaranteed FIFO (FIFO being indicated by the call to ".pop," whereas LIFO would be indicated by a call to ".head( )"), such as a queue service that supports synchronized writes. In one embodiment, a queue service is a collection of computing resources of a computing resource service provider configured to store one or more messages in queues for use by other computing resources of the computing resource service provider, such as a queue service. In one embodiment, a queue service utilizes Advanced Message Queuing Protocol (AMQP). In one embodiment, a queue service comprises a record in a database table, an array, a circular buffer, a linked list, a stack, or some other data structure. In one embodiment, a message provided to a queue service can comprise any variation of text, such as programming code, URI for a data objects, or some other data. In one embodiment, a queue service. In one embodiment, the queue service is implemented as a single queue, whereas in one embodiment the queue service is implemented as multiple queues.

In one embodiment, different application programming interface (API) calls against the typical linked list (e.g., "push( )" "pop( )" "head( )" "tail( )" etc.) are supported; however, the storage resource for use in storing the variable determined by the compiler 106 can differ based on this context of use, depending on the available backing resources. That is, in one embodiment, if the compiler 106 determines from usage of the variable in the source code that a FIFO storage resource is needed, the compiler may select a storage resource that provides optimal FIFO support, whereas if the compiler 106 determines from usage of the variable in the source code that a LIFO storage resource is needed, the compiler may select a different storage resource that provides optimal LIFO support over FIFO.

In one embodiment, a "dictionary" refers to a collection of key-value pairs, and a "hash table" refers to an associative array mapping keys to values wherein a hash function is used to compute an index into the array for finding the desired value. In one embodiment, declaration and use of a dictionary in a manner described in the present disclosure is shown below:

resources (e.g., servers, virtual machines, etc.). In such an embodiment, an object-wide variable could be stored in an out-of-process transient store such as a distributed cache cluster. The table below shows how, in one embodiment, lexical scope, data type, and consistency conditions are related to the persistent storage determined by the compiler 106:

| | CONSISTENCY: READ ONLY DATA TYPE: ALL | CONSISTENCY: STRONGLY CONSISTENT | | | CONSISTENCY: EVENTUALLY CONSISTENT | | |
|---|---|---|---|---|---|---|---|
| | | DATA TYPE: ARRAY | DATA TYPE: LINKED LIST | DATA TYPE: DICTIONARY | DATA TYPE: ARRAY | DATA TYPE: LINKED LIST | DATA TYPE: DICTIONARY |
| LEXICAL SCOPE: FUNCTION-WIDE | Local stack/heap | Mutually exclusive local stack/heap | Mutually exclusive local stack/heap | Mutually exclusive local stack/heap | Local stack/heap | Local stack/heap | Local stack/heap |
| LEXICAL SCOPE: OBJECT-WIDE | Distributed Cache Service | Distributed Cache Service | Distributed Cache Service | Distributed Cache Service | Distributed Cache Service | Distributed Cache Service | Distributed Cache Service |
| LEXICAL SCOPE: APPLICATION-WIDE | Environment Variable | Non-relational Database Service | Queue Service | Relational Database Service | Database Service | Data Streaming Service | Non-relational Database Service with Scalable Search |

```
synchronized Dictionary People=new Dictionary( )
People.add("1", new Person( ){name: "Ron"})
print(People["1"].name) // fetch by ID
print(People.filter((name)=>name.startsWith("R")))
// fetch with an item filter criteria
```

In one embodiment, with the concurrency indicated as "synchronized" and the data type being of type "Dictionary," the compiler 106 determines to store values of the dictionary in a platform-managed persistence storage with the provided key as a primary index. One difference between a dictionary and an array or linked list is that, in one embodiment, the dictionary supports filtering. As shown above, the filter criteria of "(name)=>name.startsWith('R')" is analogous to a SQL "WHERE" command, and in one embodiment, the compiler 106 would determine the storage resource for the "People" dictionary variable to be a database, and the compiler 106 would translate the filter criteria of "People.filter((name)=>name.startsWith("R"))" to an equivalent SQL query against the database in the set of compiled computer-executable instructions.

In one embodiment, the dictionary and the hash table are treated similarly for purposes of determining variable storage resource; however it is contemplated that in one embodiment the dictionary and the hash table can be treated as separate data types for the purposes of determining variable storage resource (e.g., a particular backing storage resource may be more suited for a dictionary than a hash table, or vice versa). Therefore, based on the declaration and usage of the variable in the source code, in one embodiment, the compiler maps the variable to the appropriate persistence resource for storage of the variables value.

Because the present disclosure contemplates best-effort invocation to enable the ability to distribute executable components of a software application across multiple computing resources, in one embodiment, a variable is shared among components that span across multiple computing Thus, in the table above, each of the data type, lexical scope, and consistency condition is a dimension in a multi-dimensional determination of the appropriate storage resource for the variable value. On the horizontal axis is the consistency requirement of the variable (e.g., read only, strongly consistent, or eventually consistent). Beneath the consistency requirement is the data type of the variable. On the vertical access is the accessibility scope of the variable (e.g., function-wide, object-wide, or application-wide). Thus, in the one embodiment, if a variable needs to be accessible only within a function and it is also read-only, the compiler 106 determines that its value can be stored in the memory of a local stack/heap. On the other hand, in one embodiment, if the variable needs to be read only with an application-wide lexical scope, the compiler 106 determines that the variable should be an "environment variable" set to the constant value in each environment executing portion of the set of computer-executable instructions 108 that utilize the variable. In one embodiment, "environment variable" refers to a variable in the operating system environment (e.g., LINUX, UNIX, Windows, etc.) in which the portions of the set of computer-executable instructions 108 are executing. Thus, in the case where the set of computer-executable instructions is executing within virtual machines, in one embodiment, the variable would be stored as an environment variable value within the virtual machines.

In one embodiment, a compiler 106 evaluates the source code for an application and identifies 12 read only application-wide variables. If, in this embodiment, the application is executed within a single virtual machine instance, the 12 variables would be stored as environment variables inside the one virtual machine instance. On the other hand, if the application is deployed as different functions or deployment packages to be executed on multiple virtual machine instances (e.g., as determined by a latency-aware host-agnostic runtime), in one embodiment, the compiler 106 or the executor 110 would store the appropriate environment variables corresponding to the 12 variables in the multiple virtual machine instances performing the functions that utilize those variables. In one embodiment, if the application comprises five functions which are each executed within a different virtual machine, one of the function uses three of the 12 variables and the virtual machine executing that function would utilize three environment variables for storage of those three variables, a second function uses two of the 12 variables and the second virtual machine executing that function would therefore utilize two environment variables for storage of those two variables, and a third function utilizes all 12 of the variables and thus the third virtual machine executing the third function would utilize 12 environment variables for storing of those 12 variables.

In contrast, in the one embodiment, the compiler 106 would store a strongly consistent, linked list variable with an object-wide lexical scope with a distributed cache service with native support for "push( )" and "head( )" In one embodiment, a distributed cache service is a distributed in-memory cache environment for providing general-purpose distributed memory caching. In one embodiment, the distributed cache service may improve performance of applications by caching data in fast, in-memory caches to reduce the number of times and external data source (e.g., database) must be read. In one embodiment, a distributed cache service may include cache clusters comprising cache nodes. As another contrast, in the embodiment, the compiler 106 would store the value of an eventually consistent dictionary variable with an application-wide lexical scope and would have its value be stored in a non-relational database service with scalable search support. In one embodiment, the multi-dimensional determination includes a fourth dimension of the concurrency requirement (e.g., exclusive access/shared access). In one embodiment, the multi-dimensional determination includes more than four dimensions, whereas in one embodiment the multi-dimensional determination includes less than two dimensions.

In one embodiment, the techniques described in the present disclosure are implemented as a software developers kit (SDK) enabling use of a syntax, such as described above, in an existing programming language to store variable values in a unified manner across a variety of persistence technologies. In one embodiment, the techniques described in the present disclosure are implemented as a new programming language to provide such unified access for a variety of persistence technologies. In one embodiment, the techniques described in the present disclosure are implemented to enable storage tiering for data stored in a computing device operating system. In one embodiment, local variables would be available on the local computing device, whereas global variables would be automatically synchronized to the cloud. Using techniques described in the present disclosure, in one embodiment, the software developers need only provide the minimal notations in the source code described above to enable the compiler to cause such functionality to be automatically implemented. In other words, the techniques of the present disclosure allow the software developer, in one embodiment, to abstract out of the implementation details how access to data is managed in the storage resources. In one embodiment, determination whether a variable value is stored in memory, on disk, or in a database will be determined automatically by the compiler and/or executor.

Figure 2:
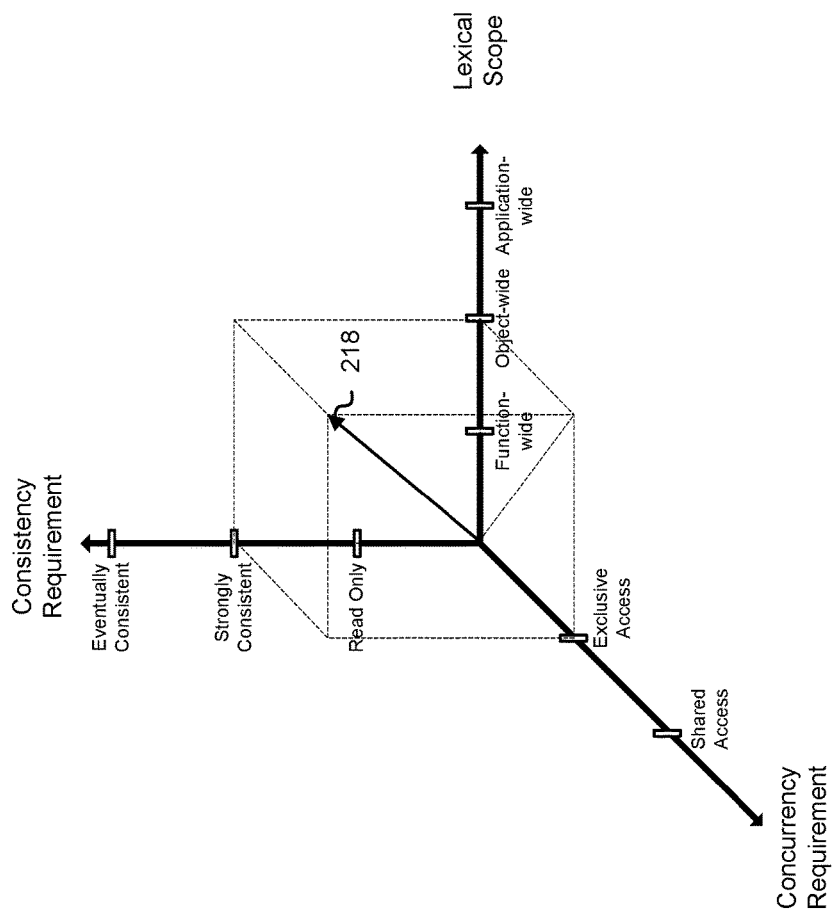
FIG. 2 illustrates an example of dimensions used in determination of storage resources for variable values in accordance with one embodiment.

In one embodiment, the multi-dimensional determination includes dimensions different from those displayed in the above table. FIG. 2 illustrates a multi-dimensional graph of one embodiment showing three dimensions (lexical scope, consistency requirement, and concurrency requirement) for making a determination of a storage resource to use for a storage of a variable value. In one embodiment, the arrow 218 illustrates a convergence of a strongly consistent, object-wide lexical scoped variable with an exclusive access requirement. The present disclosure describes embodiments whereby a software developer need not write code for explicitly storing values in particular storage resources. Instead, the present disclosure describes modification to syntax from which a compiler is able to automatically determine an appropriate storage resource and generate appropriate sets of computer-executable instructions for provisioning and accessing variable values in the storage resource.

Figure 3:
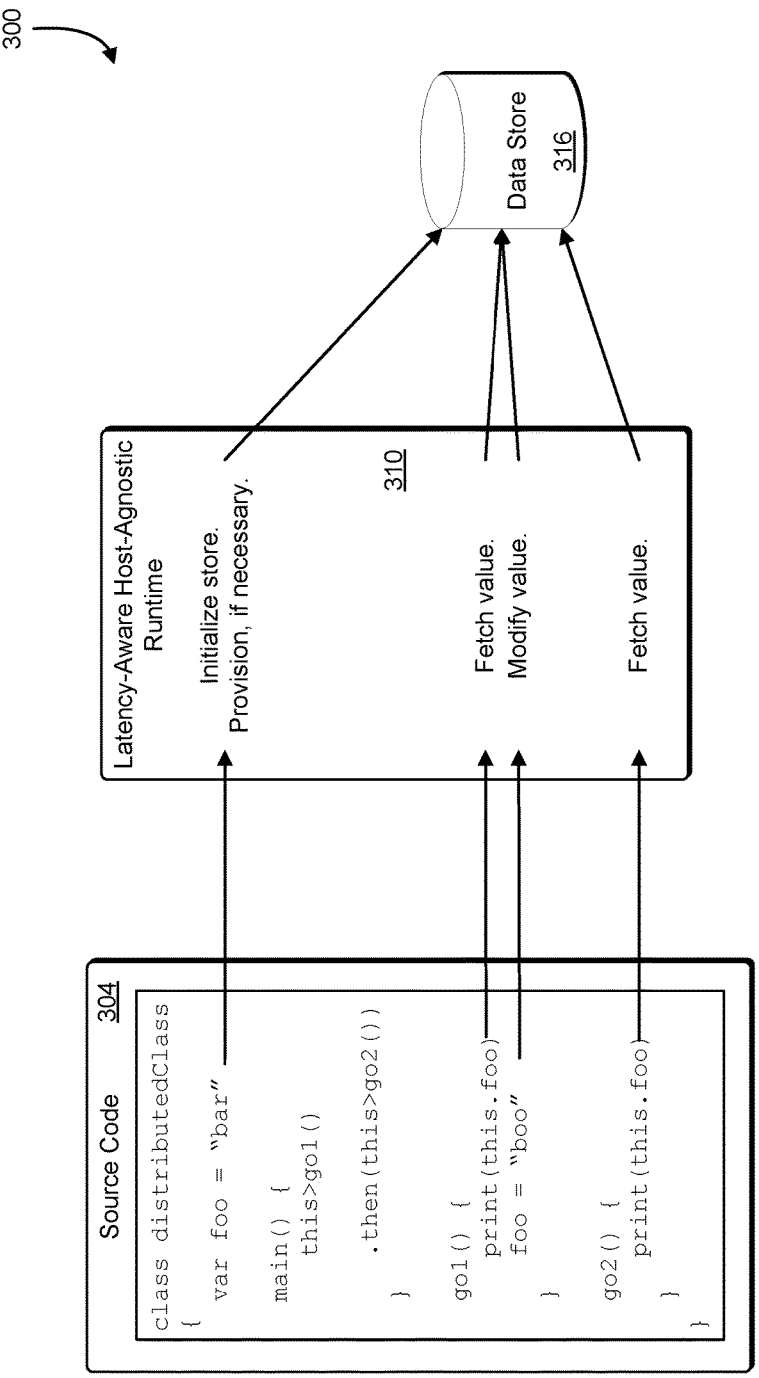
FIG. 3 illustrates an example of latency-aware host-agnostic runtime in accordance with one embodiment.

FIG. 3 illustrates an illustrative use case diagram 300 of one embodiment of the present disclosure. As illustrated in FIG. 3, the illustrative use case diagram 300 includes source code 304 that is compiled and executed in a latency-aware host-agnostic runtime 310 which fetches one or more variables from a persistent data store 316. The source code 304 is depicted as a class with three functions: "Main( )" "go10," and "go2( )" In compiling the source code, in one embodiment, the compiler determines that the variable "foo" is an object-wide variable because the variable is declared within the class "distributedClass" but outside the functions "Main ( )" "go10," and "go2( )" Thus, in one embodiment, the compiler is able to determine that the software developer intends that the object scope should span across all of the methods of "distributedClass" (i.e., "main( )", "go1( )" and "go2( )" all have access to "foo").

Note that although the source code 304 and other portions of source code in the present disclosure have characteristics similar to certain programming languages, the portions of source code in the present disclosure are to be considered pseudocode for illustrative purposes only. In one embodiment, actual notation and syntax for implementing the techniques of the present disclosure in existing or new programming languages may differ from the illustrative portions of source codes. Note too, that the source code 304 also utilizes best-effort notation. That is, in one embodiment, the arrow notation in the call to "this>go1( )" in "main( )" signifies that execution of "go1( )" may or may not happen in the same server. That is, in the one embodiment, the latency-aware host-agnostic runtime 310 compiler and/or executor will optimize where the functions or deployment packages in the computer-executable instructions will execute (e.g., in the same thread, in a different thread, etc.) depending on various constraints, such as a monetary budget constraint or a constraint of available processing resources. Thus, in one embodiment, "go1( )" could be a network call and executed on a different server from "main( )" In that circumstance, the compiler would need to ensure that the variable "foo" is still accessible from the method "go1( )" if executed out-of-process across the network. To enable this to occur, the compiler generates a set of computer-executable instructions directed to provisioning an appropriate distributed resource, the persistent data store 316, accessible by the functions that utilize the variable "foo" from wherever in the network that the functions are executing. In one embodiment, the persistent data store 316 is intended to represent any of the data storage resources described in the present disclosure (e.g., a distributed cache service, data streaming service, environment variable, etc.).

Thus, in one embodiment, the compiler generates a set of instructions that, during execution, initialize the persistent data store 316 (and provision the persistent data store 316 if not already provisioned at the time "distributedClass" is executed in the latency-aware host-agnostic runtime) for storage of the variable "foo," as well as generate the set of instructions to store the value "bar" in the persistent data store 316 for the variable "foo." In this manner, during latency-aware host-agnostic runtime, in one embodiment, during execution of "go1( )" the set of computer-executable instructions generated by the compiler include instructions that, as a result of execution of the line "print(this.foo)," fetches the value ("bar") from the persistent data store 316 rather than fetching the value from memory, since the value is not necessarily in the memory of the particular computing device that is executing "go1( )."

Likewise, execution of the line "foo='boo'" causes the latency-aware host-agnostic runtime executor to execute instructions generated by the compiler that cause the executor to, rather than modifying the value in local memory, cause the persistent data store 316 to modify the value associated with "foo" in the persistent data store 316 to "boo."

Figure 4:
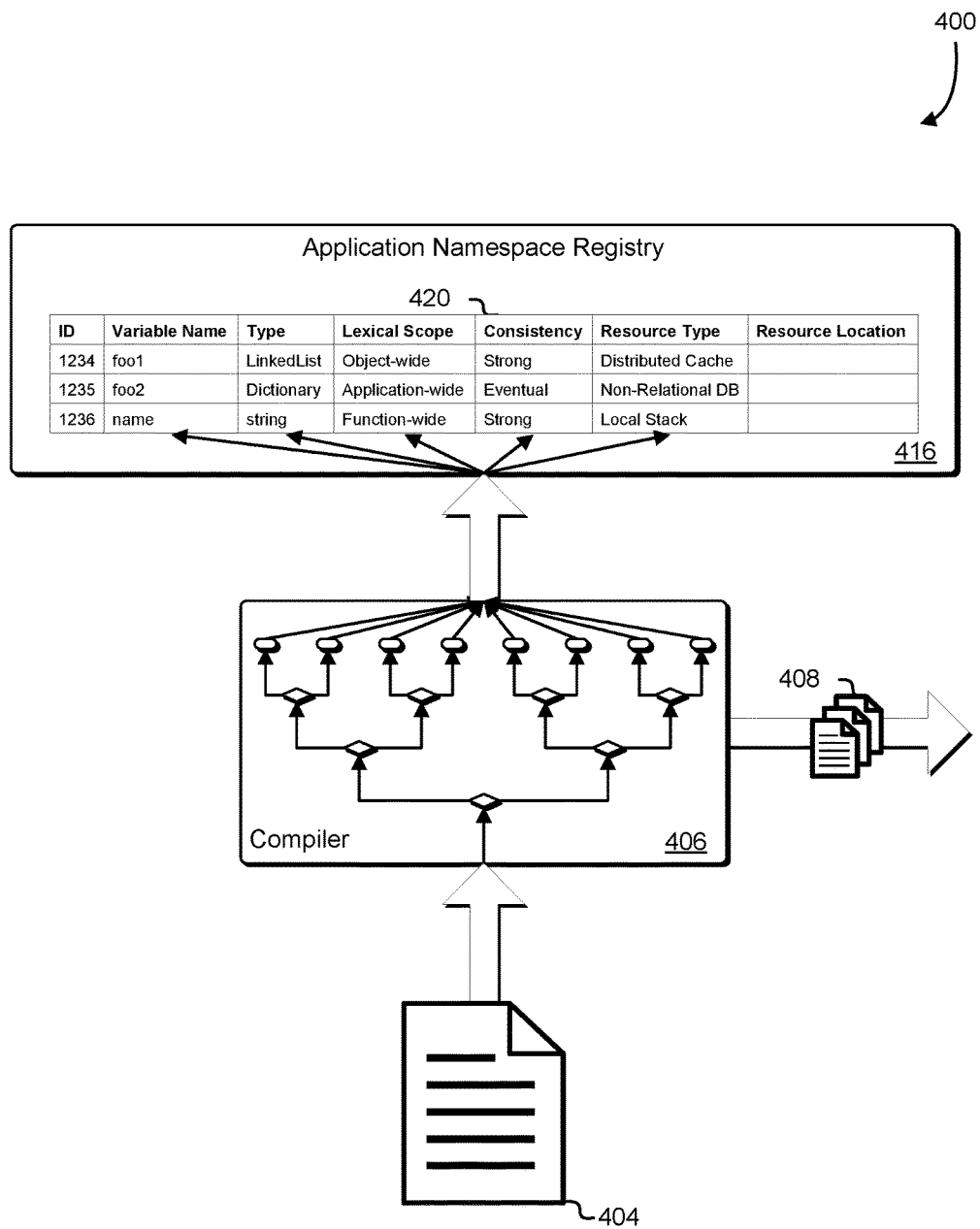
FIG. 4 illustrates an example of interaction between a compiler and an application namespace registry in accordance with one embodiment.

FIG. 4 illustrates an aspect of one embodiment 400 of the present disclosure.

Specifically, FIG. 4 depicts a compiler 406 that receives source code 404 and, as a result of parsing the source code 404, outputs a set of instructions 408 and populates an application namespace registry 416 with metadata 420 about storage resources determined by the compiler 406 for values of the variables in the source code 404.

In one embodiment, the application namespace registry 416 is similar to the application namespace registry 116 of FIG. 1. In one embodiment, the application namespace registry 416 is a data store, such as a database, or similar registry that stores the metadata 420 about different components, such as functions and variables, within an application. In one embodiment, the application namespace registry 416 includes information about which function or which variable is stored in which computing instances.

In one embodiment, the metadata 420 includes information such as an identifier for the variable, name of the variable, lexical scope of the variable, consistency requirement for the variable, data type of the variable, concurrency requirement for the variable, a resource type selected for storage of the variables value as determined by a compiler of the source code, and a resource location or other information usable to locate the storage resource in the network once the storage resource has been provisioned. Note that, in one embodiment, the actual storage resource is un-provisioned until the compiled set of instructions 408 is executed, and therefore a field such as the resource location field could be empty until the compiled set of instructions 408 is executed, at which time the resource location field is populated with the storage resource location. In one embodiment, depending on the storage resource type, the storage resource location could be an Internet protocol (IP) address to the storage resource in the network. In one embodiment, the set of instructions 408 does not expressly recite the function or commands for provisioning or initializing the resource but, instead, includes a reference in the set of instructions 408 to a software package or function; in one embodiment, the reference is an identifier that corresponds to the appropriate function or package. In one embodiment, the reference is an IP address to the underlying storage resource. In one embodiment, the application namespace registry 416 includes at least one such reference for a variable. In one embodiment, a plurality of references is used per variable (e.g., a reference to a function or API for writing, a reference to a function or API for reading, a reference to a function or API for provisioning the resource, a reference to a function or API for garbage collecting the variable, etc.). As noted, in one embodiment, the plurality of references is stored in the application namespace registry 416.

Note that in one embodiment the metadata 420 includes some, all, or none of the previously named fields, and in one embodiment includes additional fields not described in this paragraph. To illustrate, in one embodiment the concurrency requirement need not be stored in the metadata 420 if the resource type selected by the compiler 406 already provides the appropriate concurrency constraints indicated for the variable in the source code. Furthermore, it is contemplated that in one embodiment the values of the fields are stored as different data types (e.g., lexical scope stored as values of 1, 2, or 3 to represent function-wide, object-wide, application-wide respectively).

In one embodiment, the source code 404 is application source code written by a software developer, similar to the source code 104 of FIG. 1. In one embodiment, the compiler 406 is similar to the compiler 106 of FIG. 1. That is, the compiler 406 in one embodiment is responsible for translating variable notation into platform implementation instructions (i.e., a set of computer-executable instructions 408). To illustrate, in one embodiment application-wide constants are mapped to computer-executable instructions for provisioning and accessing environment variables, and object-wide variables are mapped to computer-executable instructions for provisioning and accessing distributed cache key value pairs. In one embodiment the compiler 406 scans through the source code 404, performing a static analysis. In the static analysis the compiler 406 translates the variable notations in the source code 404 into the platform-implementation instructions (e.g., a set of instructions 408). To illustrate, in one embodiment, if the compiler 406 detects that the source code 404 contains a read-only variable that spans application-wide, the compiler 406 will map the variable to one or more computer-executable instructions for provisioning host environment variables to the computing instances that will be executing the compiled source code. Similarly, in one embodiment the compiler 406 will map an object-wide variable to one or more computer-executable instructions for provisioning a distributed cache, as the compiler 406 has determined is appropriate for variables of this type.

During the static analysis, the compiler 406 determines the properties and requirements for the variables recited in the source code 404, determines appropriate storage resources for storing values of the variables, and populates corresponding fields in the application namespace registry 416. Note that in one embodiment, the compiler 406 itself does not provision the determined storage resources. That is, in one embodiment the software developer may compile the source code 404 on a computing device that is different from, or does not have access to, the eventual storage resources to be used for variable storage. Consequently, the compiler 406 generates the set of instructions 408 that, as a result of execution of the set of instructions 408 (e.g., by an executor), causes the determined storage resources to be provisioned and/or initialized. Note that in one embodiment, rather than generate the specific computer-executable instructions for provisioning and/or initializing the resource, the compiler stores in the application namespace registry 416 parameters associated with the variable that enable another component, such as the executor, to make an application programming interface call to the storage resource with the parameters to cause the particular resource to be provisioned.

Figure 5:
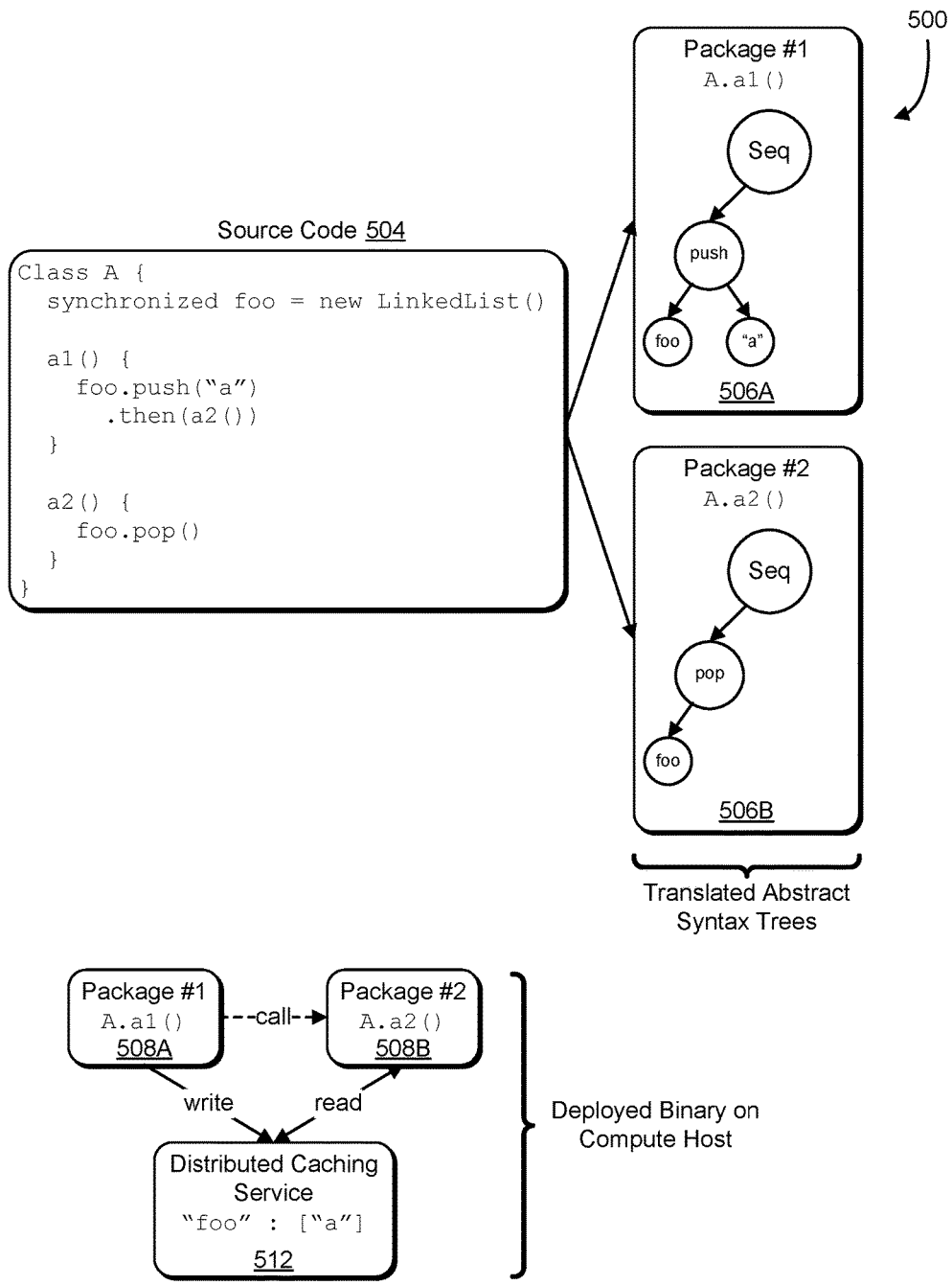
FIG. 5 illustrates an example of deployment in a latency-aware host-agnostic runtime environment.

FIG. 5 illustrates an embodiment 500 of the present disclosure. Specifically, FIG. 5 depicts source code 504 in one embodiment that has been translated into abstract syntax trees 506A-06B in the form of separate software deployment packages 508A-08B. In one embodiment, the software deployment packages 508A-08B are deployed in a distributed computing environment and utilize a distributed caching service 512 for storage of variable values.

In one embodiment, the source code 504 is a set of instructions written in a human-readable program language by a software developer that can be translated by an assembler or compiler, such as the compiler 106 of FIG. 1, into a set of computer-executable instructions executable by one or more computing devices. In the one embodiment, the source code 504 includes a variable declaration of "synchronized foo=new LinkedList( )" In one embodiment, the keyword "synchronized" indicates that the variable "foo" has a concurrency condition of exclusive access. In one embodiment, that the variable "foo" is declared outside of the functions "a1( )" and "a2( )" but within the class "A" indicates that the variable "foo" is to have object-wide lexical scope. In other words, in the one embodiment, the variable "foo" is accessible by both functions "a1( )" and "a2."

In one embodiment, the compiler compiles the separate functions "a1( )" and "a2( )" into separate software packages 508A-08B respectively, which can be represented by the respective translated abstract syntax trees 506A-06B. In one embodiment, an "abstract syntax tree" (also known as a "method call graph") is a tree representation of the lexical/syntactical structure of the blocks and statements of the source code 504. In one embodiment, each node of the tree denotes a construct occurring in the source code 504. In one embodiment, the the translated abstract syntax trees 506A-06B are usable by an executor, such as the executor 110 of FIG. 1, to aid in determining whether the software deployment packages 508A-08B should be deployed to the same host or deployed to different hosts for execution.

In one embodiment, the software deployment packages 508A-08B are one or more compiled functions of the source code 504. In one embodiment, because the software deployment packages 508A-08B could be deployed by the executor to different execution hosts and yet also include the variable "foo" that has object-wide lexical scope, the distributed caching service 512 stores the value ("a") of the variable "foo" such that it can be accessed by both software deployment packages 508A-08B regardless whether they are executing on the same execution host or different execution hosts. As can be seen, in one embodiment, software deployment package A 508A, upon execution, executes the function "a1( )" which pushes the value "a" onto the "foo" linked list stack, which thereby causes executor to write the value to the distributed caching service 512. In the one embodiment, the software deployment package A 508A then calls the function "a2( )" in software deployment package B 508B, which as noted could be executing on a different host. In one embodiment, the software deployment package B 508B, upon execution, executes the function "a2( )" which pops the value "a" from the "foo" linked list stack, which thereby causes the executor to read the value from the distributed caching service 512.

In one embodiment, the distributed caching service 512 is a service for providing distributed memory caching to improve performance of applications by caching data in fast, distributed, in-memory caches to reduce the number of times and external data source (e.g., database) must be read. In one embodiment, storing the value of the variable "foo" with the distributed caching service 512 enables the application of the source code 504 to utilize a horizontally scaled distributed computing environment whereby an object (e.g., the linked list "foo") can be shared by multiple processes running on different physical computing resources.

Figure 6:
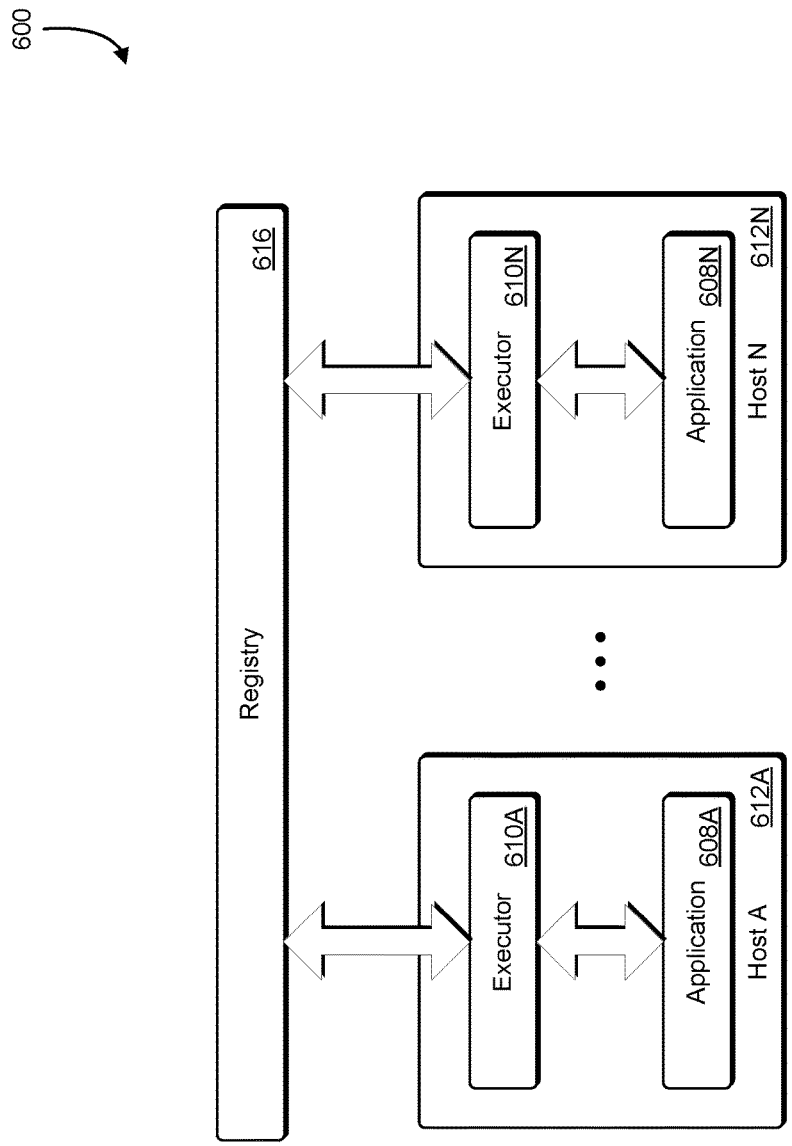
FIG. 6 illustrates an example of execution of an application on hosts in accordance with one embodiment.

FIG. 6 illustrates an aspect of one embodiment 600 of the present disclosure. Specifically, FIG. 6 depicts an application 608A-08N executing on one or more hosts 612A-12N via one or more executors 610A-10N, which obtain metadata from a registry 616 in order to access variables of the application 608A-08N. In one embodiment, the application 608A-08N is the software program that results from execution of the set of computer-executable instructions 108 or the set of instructions 408 described in FIGS. 1 and 4, respectively. In one embodiment, the application 608A-08N is a software application (e.g., website front end, operating system, credit card verification backend, media streaming service, or any other type of the software application) configured to execute on the one or more hosts 612A-12N. In one embodiment, the application 608A is a single software application executing on a single host 612A. Alternatively, in one embodiment the application 608A-08N is a single software application having functions or deployment packages that are executed on multiple of the one or more hosts 612A-12N, such as in accordance with a latency-aware host-agnostic runtime as described in FIG. 3. In one embodiment, the application 608A-08N is one or more instances of the same software program executing on the one or more hosts 612A-12N.

In one embodiment, the one or more executors 610A-10N are similar to the executor 110 of FIG. 1. In one embodiment, the one or more executors 610A-10N are one or more software programs responsible for the execution of one or more functions or deployment packages of the application 608A-08N, coordination of shared memory space of the pieces of the application 608A-08N, and ensuring access privileges between the functions or deployment packages of the application 608A-08N. In other words, in one embodiment, the one or more executors 610A-10N act as a control plane for the application 608A-08N in the environment of the service provider that provides the one or more hosts 612A-12N.

In one embodiment, the one or more executors 610A-10N serve as the platform runtime system during execution of the application 608A-08N. In one embodiment, each of the one or more executors 610A-10N is a separate software program executing on respective hosts 612A-12N to independently serve their respective portion of the application 608A-08N. Note that in one embodiment, multiple applications that are executing on a single host 612A are served by a single executor 610A executing on the single host 612A. In one embodiment, each application executing on the single host 612A is served by its own corresponding executor. In one embodiment, the one or more hosts 612A-12N are separate threads or separate virtual machines, and the one or more executors 610A-10N are a single executor that executes within the hypervisor or a controlling domain on the physical computing system hosting the separate virtual machines, and the single executor serves the applications running in the separate virtual machines. In one embodiment, the one or more executors 610A-10N are a single executor that executes in a separate host, which could be operating as a separate service on a separate computing system from the one or more hosts 612A-12N, and serves the applications running on the one or more hosts 612A-12N through a network communicatively connecting the single executor with the one or more hosts 612A-12N.

In one embodiment, when a function of the application 608A-08N attempts to retrieve or modify a value of the variable, a call is made to a respective executor of the function of the application 608A-08N, and the respective executor will, in turn, query the registry 616 to obtain information usable to retrieve or modify the value of the variable at the storage resource storing the value of the variable. Thus, in one embodiment, the one or more executors 610A-10N coordinate accessing variable values from the appropriate resources based on the mappings determined by a compiler of the source code of the application 608A-08N. In one embodiment, the one or more executors 610A-10N further ensure that certain constraints indicated by the software developer in the source code are enforced (e.g., concurrency requirement); e.g., in the one embodiment, if a variable is declared by the software developer to be function-wide in lexical scope and a different function is trying to access the variable, the one or more executors 610A-10N prevent the different function from accessing the value of the variable. Likewise, in one embodiment, in the event that a storage resource determined by the compiler for the variable does not have built-in support for exclusive write access, the one or more executors 610A-10N are configured to ensure that only one function at a time is able to modify the variable value. On the other hand, in one embodiment, if the storage resource determined by the compiler has support for the specified requirement, the one or more executors 610A-10N omit this enforcement since it is handled by the storage resource.

In one embodiment, the one or more executors 610A-10N, as a result of executing the appropriate computer-executable instructions as determined by the compiler, provision and initialize the storage resources for the variables. After the storage resources are provisioned and initialized in one embodiment, the one or more executors 610A-10N update the registry 616 with information about the storage resources that were provisioned and initialized. In the one embodiment, the update includes indications that the storage resources were provisioned and initialized (and therefore this step need not be repeated), and in one embodiment, the update includes information usable to locate the variable value in storage (e.g., an IP address of the storage service and/or other information for locating the variable value in the storage resource).

In addition, during runtime, in one embodiment, the one or more executors 610A-10N keep track of the live objects/variables for garbage collection as needed; e.g., in one embodiment, the one or more executors 610A-10N perform reference counting; that is, as new functions attempt to access (read from or write to) a variable, the one or more executors 610A-10N increment a counter associated with the variable. In the one embodiment, as those functions are disposed, the one or more executors 610A-10N decrement the counter. In the one embodiment, if the counter reaches zero, garbage collection is performed to remove the variable record from the storage resource to which it was assigned; e.g., in the one embodiment, if the variable value is stored in a queue service or in an distributed cache, as a result of the counter reaching zero, the variable/value is removed from the queue service or the distributed cache. It is contemplated in the present disclosure that, in one embodiment, a garbage collection technique other than reference counting is utilized.

In one embodiment, the one or more hosts 612A-12N are hosts similar to the hosts 112 of FIG. 1. In one embodiment, the one or more hosts 612A-12N are responsible for providing the compute environment that performs each of the functions or deployment packages of the application 608A-08. In one embodiment, the one or more hosts 612A-12N further provide distributed storage as needed, such as caches for shared memory storage for the functions or deployment packages of the application 608A-08N. In one embodiment, the one or more hosts can be one or more physical computing devices, one or more virtual machines, or one or more execution threads, or any combination thereof.

In a use case of one embodiment, an application (e.g., an execution of a compiler-generated software container image) includes object-wide and application-wide shared variables. The application in this use case executes on five virtual machine instance hosts. In the one embodiment whereby the one or more executors 610A-10N are separate processes running on each of the one or more hosts 612A-12N, each of the one or more executors 610A-10N is able to query the registry 616 to determine the storage resources with which it needs to communicate with in order to access the shared variables. In the one embodiment, each of the portions of the applications 608A-08N include computer-executable instructions for calling the respective executor executing on the local host in order to access those shared variables. Thus, in one embodiment, for the application 608A-08N, fetching or modifying a variable value is a local request call. As noted, in one embodiment the executor is a platform runtime system that determines how to translate variable access calls into resource-specific instructions and execute those instructions.

Benefits of the techniques described in the present disclosure include, in one embodiment, enabling discrete functions or deployment packages of distributed applications to access shared variables without burdening the software developer with having to write explicit code for accessing the underlying storage resources. Furthermore, in the one embodiment, a software developer with present knowledge of a programming language need not learn a specific storage resource technology in order to take advantage of the underlying storage resources; e.g., in one embodiment, a dictionary object in source code is still treated as a dictionary object regardless whether the dictionary object is stored in memory or in an SQL database with the computing resource service provider. Moreover, further benefits are realized because, in one embodiment, as underlying storage resource technology changes, the underlying storage resources can be updated or replaced with different underlying storage resources without necessitating a change to the source code, and existing source code can thus still take advantage of improvements to the underlying storage resources. In other words, in one embodiment, a developer need not make a change to source code that utilizes a linked list that utilizes a storage resource A for variable storage if the storage resource A is replaced or upgraded to storage resource B. In one embodiment, if such storage resource A is replaced or upgraded to storage resource B, the existing values of variables in storage resource A are migrated to the replacement storage resource B. Alternatively, in one embodiment, upon execution of the set of executable instructions from the compiled source code, an attempt to access a variable value stored in storage resource A but not yet migrated to storage resource B causes the variable value to be migrated to storage resource B.

Yet another benefit in one embodiment lies in allowing the same set of source code to utilize different optimal storage resources for different platforms. In one embodiment a given piece of source code compiled, deployed, and executed on virtual machines at a computing resource service provider may use a high-performance distributed database for variable storage, whereas the same source code if compiled and/or deployed and executed on a mobile device may utilize a different storage resource optimized for use with that mobile device. In one embodiment, an executor serving an application deployed to a virtual machine in a computing resource provider environment determines to use an SQL database for storing a dictionary, whereas an executor deployed to a cellular phone upon which the same application is running determines (e.g., in order to save on battery life or communication bandwidth) to use the phone's memory as the underlying storage resource.

In one embodiment, as mentioned above, the one or more executors 610A-10N are responsible for garbage collection (i.e., reclaiming) of unused variables. In one embodiment, the one or more executors 610A-10N perform reference counting to keep track of how many functions are currently using a particular variable. In this one embodiment, the one or more executors 610A-10N update the registry 616 or other data store with the reference count. As a result of detecting that the variable is no longer in use (e.g., the reference count is zero), in one embodiment, the variable's records are erased/removed from the underlying storage resource. Note that in one embodiment, a component other than the one or more executors 610A-10N is responsible for garbage collection; in this one embodiment, the garbage collection component is responsible for erasure/removal of the variable's records. In this one embodiment, the garbage collection component periodically polls the registry 616 or receives an event notice as a result of the occurrence of a reference count decreasing to zero, at which time the garbage collection component determines that the corresponding variable's records can be removed/erased. It is contemplated that in one embodiment a different method of garbage collection is implemented.

Figure 7:
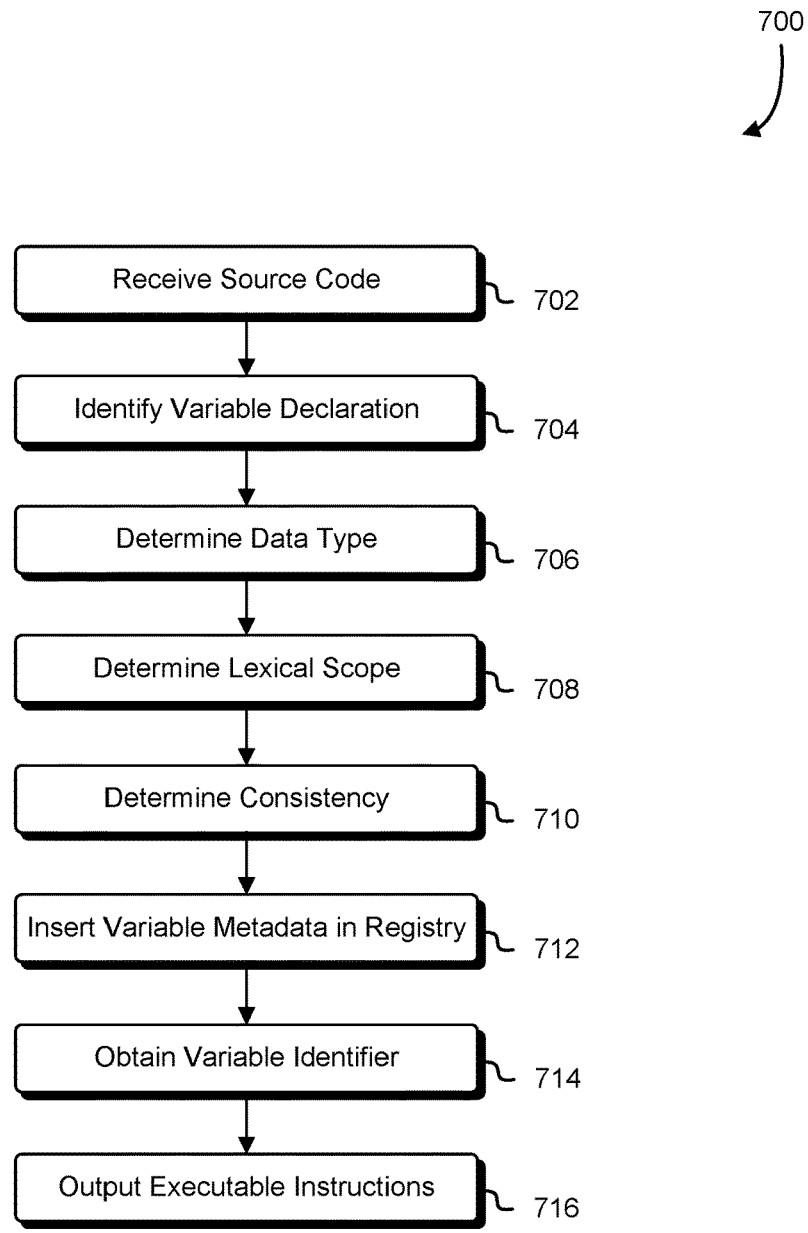
FIG. 7 is a flow diagram that illustrates an example of compiling source code in accordance with one embodiment.

FIG. 7 is a flow diagram illustrating one embodiment of a process 700 for compiling source code in accordance with one embodiment. In one embodiment, some or all of the process 700 (or any other processes described, or variations and/or combinations of those processes) is performed under the control of one or more computer systems configured with computer-executable instructions and/or other data and, in one embodiment, are implemented as computer-executable instructions executing collectively on one or more processors. In one embodiment, the computer-executable instructions and/or other data are stored on a non-transitory computer-readable storage medium (e.g., a computer program persistently stored on magnetic, optical, or flash media).

Figure 10:
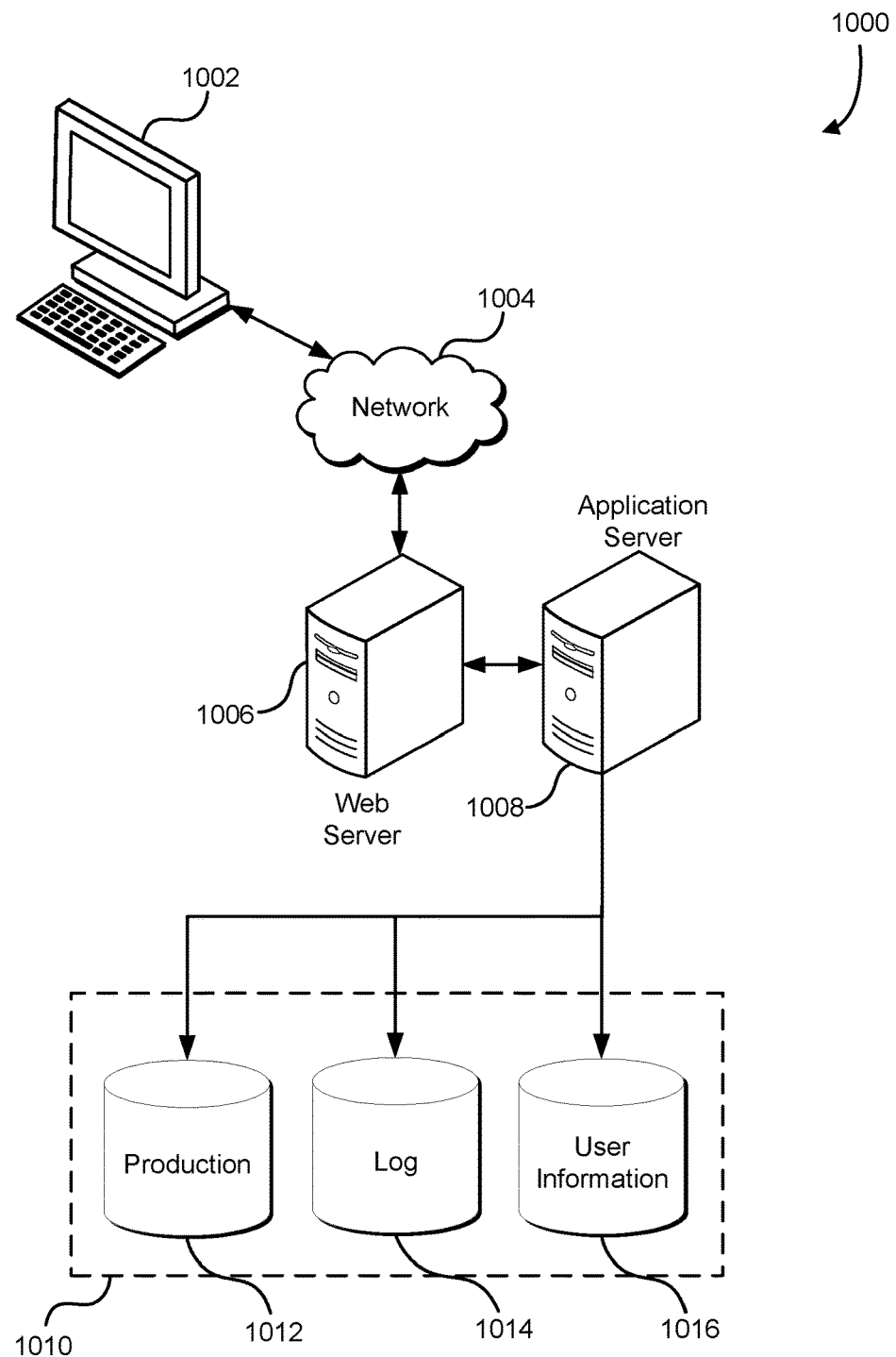
FIG. 10 illustrates an environment in which one embodiment can be implemented.

In one embodiment, some or all of process 700 is performed by system, such as a server in a data center, by various components of the environment 1000 described in conjunction with FIG. 10, such as the web server 1006 or the application server 1008, by multiple computing devices in a distributed system of a computing resource service provider, or by any electronic client device such as the electronic client device 1002. The process 700 includes a series of operations wherein source code is received, variable declarations are identified, data types of the variables are determined, the lexical scope of the variables are determined, the consistency conditions (e.g., constant, strongly consistent, eventually consistent, etc.) of the variables are determined, the metadata about the variables are inserted into an application namespace registry, which returns identifiers for the variables, and a set of computer-executable instructions are generated.

In one embodiment, in 702, the system performing the process 700 receives source code, such as the source code 104 of FIG. 1. In one embodiment, the source code is received from a client device, such as the client 102 of FIG. 1, whereas in one embodiment the source code is obtained from a file, database or other source. In one embodiment, in 704, the system performing the process 700 parses the received source code to identify the various variables used within the source code. In one embodiment, the system can identify the variables by parsing the source code to identify the variable declarations (e.g., parsing the source code and searching for the string "var"). However it is contemplated that not all programming languages require explicit variable declarations, and for such languages, in one embodiment, the system parses through the source code and identifies non-keyword/non-operator strings as the variables. In one embodiment, in 706, as the system parses the received code, the system identifies the type of variable being declared. That is, in one embodiment, variable types include, without limitation, integer, string, Boolean, floating-point, character, linked lists, dictionaries, and arrays of any of the above.

In one embodiment, in 708, as the system parses the received code, the system determines the lexical scope of the identified variables. That is, in one embodiment, the system parses and identifies the functions in the source code, and if a variable is declared within the function, the system determines that the lexical scope of the variable is function-wide. In one embodiment, the system parses and identifies the classes in the source code that encompass the functions, and if a variable is declared within an object class, the system determines that the lexical scope of the variable is object-wide. Similarly, in one embodiment, if a variable is declared outside of the object classes, the system determines that the lexical scope of the variable is application-wide.

In one embodiment, in 710, as the system parses the received code, the system determines the consistency requirements for the identified variables. In one embodiment, if the variable declaration is preceded by a keyword "const," the system may determine that the variable is to be treated as read-only. In one embodiment, if, in the source code, the variable value is retrieved without using a "peek ( )" call, the system may determine that the variable is to be strongly consistent. In one embodiment, if, in the source code, the variable is used with a "peek( )" call, the system may determine that the variable is to be eventually consistent. Although various keywords and symbols are used in the present disclosure, it is contemplated that, in one embodiment, different keywords, different symbols, and different methods of indicating variable declarations, variable data types, lexical scope, consistency, and/or concurrency requirements for variables alternatively are used. In one embodiment, in 712, the system causes a registry, such as the application namespace registry 116 of FIG. 1 or the application namespace registry 416 of FIG. 4, with metadata regarding information about the variable identified in 702-10 (e.g., Lexical scope, consistency requirement, data type, etc.).

In one embodiment, in 714, in return for inserting metadata about a variable in the registry, the system may receive an identifier for the variable. In one embodiment, the system performing the process 700 may utilize the identifier to indicate operations to be performed in association with the variable. In one embodiment, in 716, the system generates a set of computer-executable instructions that, when executed by a host in conjunction with an executor as described in the present disclosure, perform the operations indicated in the source code received in 702. Within the set of computer-executable instructions, in one embodiment, the set of instructions include instructions for accessing (e.g., reading, writing, etc.) the storage resources storing the values of the variables identified in 704. In one embodiment, the system performing the process 700 determines the storage resources to use for each variable and generates a set of corresponding computer-executable instructions for the instances in the source code having operations that access the variables. In one embodiment, the system performing the process 700, rather than determining the storage resources at this time, generates a command for accessing whatever storage resource will be used to store the variable value and includes with the command the variable identifier as a parameter. The command, in one embodiment, as a result of execution (e.g., by the executor), causes the storage resource, as determined based on the metadata associated with the variable identifier, to be provisioned and initialized, and the executor executes the appropriate computer-executable instructions for the storage resource for operations in the source code that access the variable's value.

Note that, in one embodiment, one or more of the operations performed in 702-16 are performed in various orders and combinations, including in parallel. Furthermore, in one embodiment more, less, or different operations are performed in the operations shown in FIG. 7. In one embodiment, the system parsing the source code in 702-10 also identifies concurrency requirements, such as based on a "synchronized" keyword, and include that in the variable metadata in 712. Alternatively, in one embodiment, the operations for identifying the data type 706 are omitted.

Figure 8:
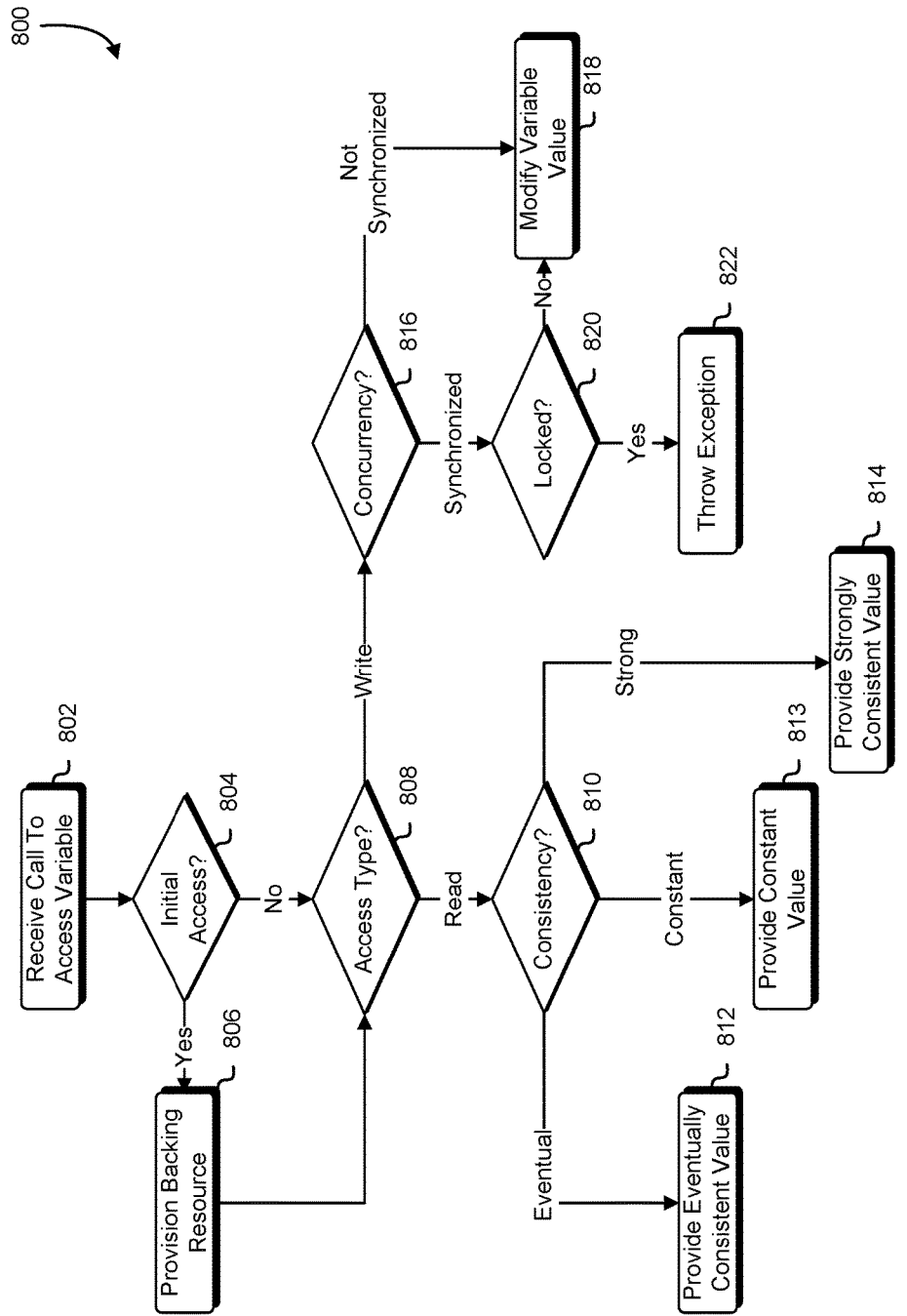
FIG. 8 is a flow chart that illustrates an example of executor runtime in accordance with one embodiment.

FIG. 8 is a flowchart illustrating one embodiment of a process 800 for executor runtime in accordance with one embodiment. In one embodiment, some or all of the process 800 (or any other processes described, or variations and/or combinations of those processes) are performed under the control of one or more computer systems configured with computer-executable instructions and/or other data and, in one embodiment, are implemented as computer-executable instructions executing collectively on one or more processors. In one embodiment, the computer-executable instructions and/or other data are stored on a non-transitory computer-readable storage medium (e.g., a computer program persistently stored on magnetic, optical, or flash media).

In one embodiment, some or all of process 800 is performed by any suitable system, such as a server in a data center, by various components of the environment 1000 described in conjunction with FIG. 10, such as the web server 1006 or the application server 1008, by multiple computing devices in a distributed system of a computing resource service provider, or by any electronic client device such as the electronic client device 1002. The process 800 includes a series of operations wherein the system (e.g., an executor) receives a call (e.g., from a host that is executing a set of computer-executable instructions) to access a variable value. In one embodiment, the system determines whether the request is an initial request for access and, if so, provisions the appropriate storage resource. In one embodiment, the system performing the process 800 determines the access type, the various conditions related to the variable and whether those conditions have been fulfilled, and performs the appropriate operations in accordance with the access call.

In one embodiment, in 802, as mentioned, the system performing the process 800 receives a call (e.g., from a host, such as the host 112 of FIG. 1 or the one or more hosts 612A-12N of FIG. 6) to initialize, read, write, or otherwise access a variable. In one embodiment, the call received includes a variable identifier that corresponds to metadata of the variable stored in an application namespace registry, such as the application namespace registry 116 of FIG. 1 or the registry 616 of FIG. 6.

In one embodiment, in 804, the system performing the process determines whether the call received in 802 is the first attempt to access the variable by the application being executed from which the call was made. If so, in one embodiment, the system performing the process proceeds to 806. In one embodiment, in 806, the system performing the process 800 performs operations to provision and/or initialize the appropriate storage resource for storage of the variable's value. In one embodiment, this operation includes requesting metadata associated with the variable identifier, and determining an appropriate resource in which to store the variable value based on the metadata. In one embodiment, if the metadata specifies that the variable is an application-wide array, the system performing the process 800 determines that the variable is to be stored in a non-relational database service. More information regarding this determination is found in the description of FIG. 1. Note, however, in one embodiment, determination of the storage resource is performed by a compiler or other component of the computing resource service provider 114 of FIG. 1. Once the particular storage resource is determined, in one embodiment, the system provisions and/or initializes the storage resource such as by reserving a storage location for the variable value with the determined storage resource (e.g., creating a database entry with the database service, reserving a queue with a queue service, etc.). The system performing the process 800, in one embodiment, updates an application namespace registry entry associated with the variable identifier to include information for accessing the particular storage resource determined, such as a network address and/or other location information for locating the variable value in the storage resource.

In one embodiment, upon provisioning and/or initializing the storage resources, or if the system determines in 804 that the storage resources for the variable have already been provisioned and initialized, in 808, the system performing the process 800 determines the type of access being requested in the call received in 802. In one embodiment, if the request received in 802 is a fetch/or read request, the system proceeds to 810. In one embodiment, in 810, the system determines the type of data consistency desired for the fetch/read request. In one embodiment, if the data consistency is indicated to be eventually consistent in a manner described in the present disclosure, the system proceeds to 812 whereupon the system performing the process 800 provides to the requester the value of the variable as it is currently available to the system. Otherwise, in one embodiment, if the system determines that the data consistency is indicated to be constant (e.g., by the declaration prefix "const"), the system provides to the requester the constant value of the variable in 813. Still otherwise, in one embodiment, if the system determines that the data consistency is indicated to be strongly consistent in a manner described in the present disclosure (e.g., by the lack of an indication of eventual consistency or constant consistency), the system in 814 provides the most recent state of the variable. If the most recent state of the variable has not yet propagated to the system performing the process 800, in one embodiment, the system delays providing the value of the variable until the most recent state of the variable is propagated to the system. In one embodiment, the enforcement of strong consistency is a built-in function of the storage resource for the variable value, in which case the system performing the process 800 provides the value of the variable upon obtaining the value from the storage resource.

In one embodiment, if the system determines in 808 that the request received in 802 is a write/modify request, the system proceeds to 816, whereupon the system determines the concurrency condition (e.g., exclusive access or shared access) for the variable. Note that, in one embodiment, data concurrency can be a built-in function of the storage resource for the variable, and if such storage resource has built-in functionality for enforcing data concurrency the system omits the operations 816 and, instead, proceeds directly to 820. In the event that the variable has shared concurrency, in one embodiment, the system performing the process 800 proceeds to 818, whereupon the variable is modified in accordance with the request received in 802. In the event that the variable has the property of exclusive access, in one embodiment, the system proceeds to 820 whereupon the system determines whether the variable is locked for writing (e.g., another thread is currently writing to the variable).

If not, in one embodiment, the system proceeds to 818, locks the variable for write, modifies the variable, and releases the lock. Otherwise, in one embodiment, in 822, the system performing the process 802 responds to the requester of 802 that the attempt to write to the variable has resulted in an exception (e.g., because another thread was writing to the variable). Note that, in one embodiment, one or more of the operations performed in 802-22 are performed in various orders and combinations, including in parallel.

Figure 9:
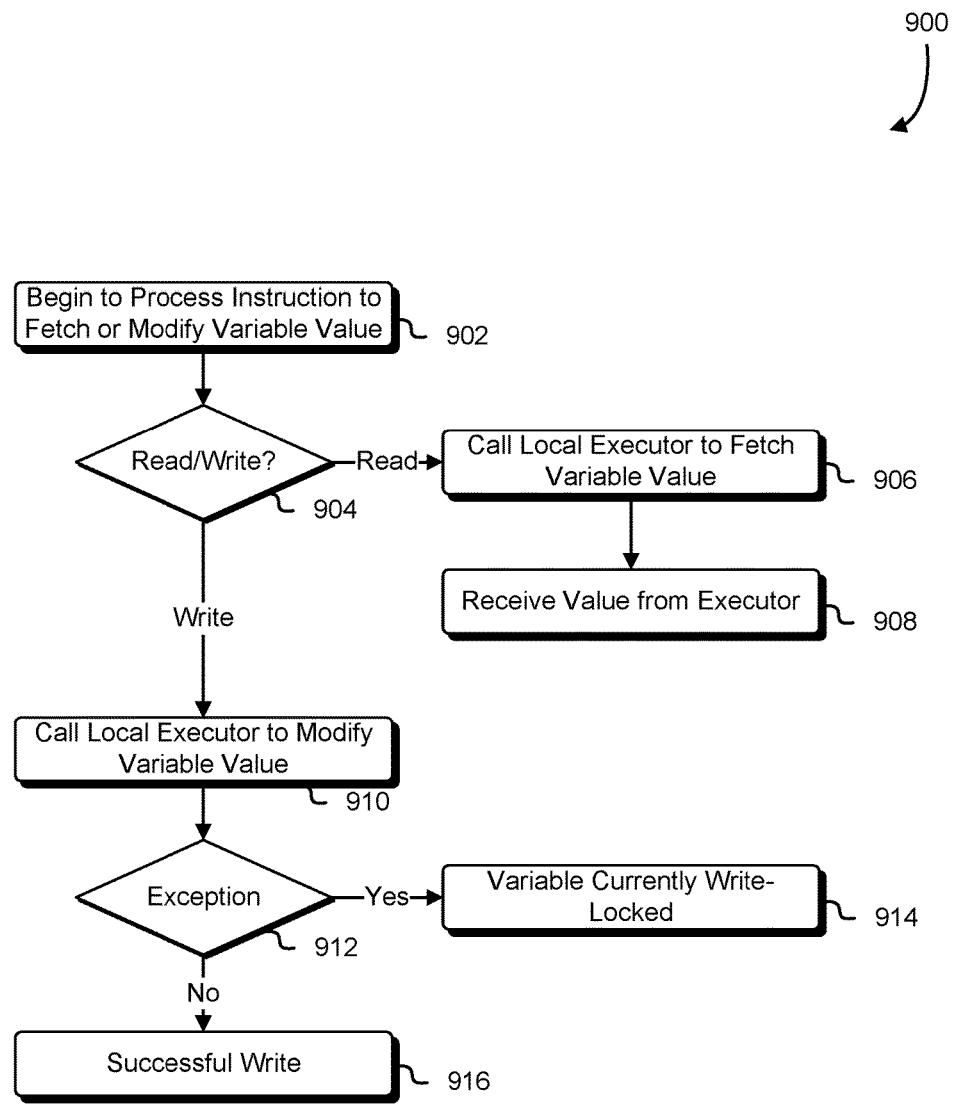
FIG. 9 is a flow chart that illustrates an example of variable access by an application in accordance with one embodiment.

FIG. 9 is a flowchart illustrating one embodiment of a process 900 for a host execution of an application in accordance with one embodiment. In one embodiment, some or all of the process 900 (or any other processes described, or variations and/or combinations of those processes) are performed under the control of one or more computer systems configured with computer-executable instructions and/or other data and, in one embodiment, are implemented as computer-executable instructions executing collectively on one or more processors. The computer-executable instructions and/or other data, in one embodiment, are stored on a non-transitory computer-readable storage medium (e.g., a computer program persistently stored on magnetic, optical, or flash media).

In one embodiment, some or all of process 900 are performed by any suitable system, such as a server in a data center, by various components of the environment 1000 described in conjunction with FIG. 10, such as the web server 1006 or the application server 1008, by multiple computing devices in a distributed system of a computing resource service provider, or by any electronic client device such as the electronic client device 1002. The process 900 includes a series of operations wherein the system performing the process 900 begins processing a set of computer-executable instructions, the type of access is determined, and the system communicates with an executor for access to the variable value in the storage resources in a manner described in the present disclosure.

In one embodiment, in 902, the system performing the process 900 begins execution of a set of computer-executable instructions, such as a set of computer-executable instructions output in 716 of FIG. 7. Upon reaching an executable instruction attempting to fetch or modify a variable value, in one embodiment, the system proceeds to 904. In one embodiment, in 904, the system determines whether the access operation is a read/fetch operation, in which case the system proceeds to 906, or whether the access operation is a write/modify operation, in which case the system proceeds to 910.

In one embodiment, in 906, the system performing the process 900 makes a request, such as the request made to the system that performs the process 800 of FIG. 8 to fetch the value of the variable. In one embodiment, in 908, the system receives the value of the variable in response to the request of 906. On the other hand, if the access operation is a write/modify operation, in one embodiment, in 910, the system performing the process 900 makes a request such as the request made to the system that performs the process 800 of FIG. 82 to modify the value of the variable. If the system is notified of an exception, in one embodiment, in 912, the system proceeds to 914 and can determine whether the exception is related to the variable being locked for writing. In one embodiment, if the variable is currently locked for writing the system performing the process can return to 910 to repeat the attempt to modify the variable value.

Otherwise, if the system does not receive notice of an exception, in one embodiment, in 916, the system performing the process 900 determines that the write is successful and continues with the processing of the set of computer-executable instructions until encountering the next occurrence of an operation to access the variable, whereupon the process 900 is repeated. Note that, in one embodiment, one or more of the operations performed in 902-16 are performed in various orders and combinations, including in parallel.

Note that in the context of describing disclosed embodiments, unless otherwise specified, use of expressions regarding computer-executable instructions (also referred to as code, applications, agents, etc.) that are performing operations that "instructions" do not ordinarily perform unaided (e.g., transmission of data, calculations, etc.) are to be construde as denoting that the computer-executable instructions are being executed by a machine, thereby causing the machine to perform the specified operations.

FIG. 10 illustrates aspects of an example environment 1000 for implementing aspects in accordance with one embodiment. As will be appreciated, although a web-based environment is used for purposes of explanation, in one embodiment, a different environments could be used, as appropriate, to implement various embodiments. The environment includes an electronic client device 1002, which can include any appropriate device operable to send and/or receive requests, messages, or information over an appropriate network 1004 and convey information back to a user of the device. Examples of such client devices include personal computers, cell phones, handheld messaging devices, laptop computers, tablet computers, set-top boxes, personal data assistants, embedded computer systems, electronic book readers, and the like. The network 1004 can include any appropriate network, including an intranet, the Internet, a cellular network, a local area network, a satellite network or any other network and/or combination thereof. Components used for such a system can depend at least in part upon the type of network and/or environment selected. Many protocols and components for communicating via such a network are well known and will not be discussed in detail. Communication over the network 1004 can be enabled by wired or wireless connections and combinations thereof. In an embodiment, the network 1004 includes the Internet and/or other publicly-addressable communications network, as the environment includes a web server 1006 for receiving requests and serving content in response thereto, although for other networks an alternative device serving a similar purpose could be used as would be apparent to one of ordinary skill in the art.

The illustrative environment includes an application server 1008 and a data store 1010. It should be understood that, in one embodiment, there are several application servers, layers or other elements, processes or components, which are chained or otherwise configured, and which can interact to perform tasks such as obtaining data from an appropriate data store. Servers, as used, may be implemented in various ways, such as, in one embodiment, as hardware devices or, in one embodiment, as virtual computer systems. In one embodiment, a "servers" refers to a programming module being executed on a computer system. As used, unless otherwise stated or clear from context, in one embodiment, the term "data store" refers to any device or combination of devices capable of storing, accessing and retrieving data, which include, without limitation, any combination and number of data servers, databases, data storage devices and data storage media, in any standard, distributed, virtual or clustered environment. The application server 1008 can include any appropriate hardware, software and firmware for integrating with the data store 1010 as needed to execute aspects of one or more applications for the electronic client device 1002, handling some or all of the data access and business logic for an application. In one embodiment, the application server 1008 provides access control services in cooperation with the data store 1010 and is able to generate content including, text, graphics, audio, video and/or other content usable to be provided to the user, which, in one embodiment, is served to the user by the web server 1006 in the form of HyperText Markup Language ("HTML"), Extensible Markup Language ("XML"), JavaScript, Cascading Style Sheets ("CSS"), JavaScript Object Notation (JSON), and/or another appropriate client-side structured language. In one embodiment, content transferred to a client device is processed by the electronic client device 1002 to provide the content in one or more forms including, forms that are perceptible to the user audibly, visually, and/or through other senses. The handling of all requests and responses, as well as the delivery of content between the electronic client device 1002 and the application server 1008, in one embodiment, can be handled by the web server 1006 using one or more of PHP: Hypertext Preprocessor ("PHP"), Python, Ruby, Perl, Java, HTML, XML, JSON, and/or another appropriate server-side structured language. Further, in one embodiment, operations described as being performed by a single device are, unless otherwise clear from context, performed collectively by multiple devices, which, in one embodiment, form a distributed and/or virtual system.

The data store 1010 can include several separate data tables, databases, data documents, dynamic data storage schemes and/or other data storage mechanisms and media for storing data relating to a particular aspect of the present disclosure. For example, in one embodiment, the data store 1010 includes mechanisms for storing production data 1012 and user information 1016, which can be used to serve content for the production side. In one embodiment, the data store 1010 also includes a mechanism for storing log data 1014, which can be used for reporting, analysis or other purposes. It should be understood that there can be many other aspects that may need to be stored in the data store 1010, such as, in one embodiment, page image information or access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one embodiment, the application server 1008 provides static, dynamic, or a combination of static and dynamic data in response to the received instructions. In one embodiment, dynamic data, such as data used in web logs (blogs), shopping applications, news services, and other applications are generated by server-side structured languages as described or are provided by a content management system ("CMS") operating on, or under the control of, the application server 1008. In one embodiment, a user, through a device operated by the user, can submit a search request for a certain type of item. In this embodiment, the data store 1010 might access the user information 1016 to verify the identity of the user and can access the catalog detail information to obtain information about items of that type. The information then can be returned to the user, such as in a results listing on a web page that the user is able to view via a browser on the electronic client device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

In one embodiment, each server includes an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction in FIG. 10 should be taken as being illustrative in nature and not limiting to the scope of the disclosure.

The various embodiments further can be implemented in a wide variety of operating environments, which in some embodiments can include one or more user computers, computing devices or processing devices that can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. In one embodiment, the network 1004 can be, is a local area network, a wide-area network, a virtual private network, the Internet, an intranet, an extranet, a public switched telephone network, an infrared network, a wireless network, a satellite network, and any combination thereof. In one embodiment, connection-oriented protocols are used to communicate between network endpoints. Connection-oriented protocols (sometimes called connection-based protocols) are capable of transmitting data in an ordered stream. Connection-oriented protocols can be reliable or unreliable. For example, in one embodiment, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In one embodiment utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. In one embodiment, the server(s) are also capable of executing programs or scripts in response to requests from user devices, such as by executing one or more web applications that, in one embodiment, are implemented as one or more scripts or programs written in any programming language, such as Java®, C, C# or C++, or any scripting language, such as Ruby, PHP, Perl, Python or TCL, as well as combinations thereof. In one embodiment, the server(s) also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In one embodiment, database servers include table-based servers, document-based servers, unstructured servers, relational servers, non-relational servers, or combinations of these and/or other database servers.

In one embodiment, the environment can include a variety of data stores and other memory and storage media as discussed above. These can reside in a variety of locations, in one embodiment, such as on a storage medium local to (and/or resident in) one or more of the computers or remote from any or all of the computers across the network 1004. In one embodiment, the information resides in a storage-area network ("SAN") familiar to those skilled in the art. Similarly, in one embodiment, any necessary files for performing the functions attributed to the computers, servers or other network devices are be stored locally and/or remotely, as appropriate. Where a system in one embodiment includes computerized devices, each such device can include hardware elements (e.g., a central processing unit ("CPU" or "processor"), an input device (e.g., a mouse, keyboard, controller, touch screen or keypad), an output device (e.g., a display device, printer, or speaker), etc.) that are electrically coupled via a bus. In one embodiment, a system also includes one or more storage devices, such as disk drives, optical storage devices, and solid-state storage devices such as random access memory ("RAM") or read-only memory ("ROM"), as well as removable media devices, memory cards, flash cards, etc.

In one embodiment, such devices also can include a computer-readable storage media reader, a communications device (e.g., a modem, a network card (wireless or wired), an infrared communication device, etc.), and working memory as described above. In one embodiment, the computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. In one embodiment, the system and various devices also include a number of software applications, modules, services, or other elements located within a working memory device, including an operating system and application programs, such as a client application or web browser. In addition, in one embodiment, customized hardware is also used and/or particular elements are implemented in hardware, software (including portable software, such as applets) or both. Further, in one embodiment, connection to other computing devices such as network input/output devices is employed.

In one embodiment, storage media and computer readable media for containing code, or portions of code, include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In one embodiment, the code is stored on set of one or more non-transitory computer-readable storage media having stored thereon executable instructions that, when executed (i.e., as a result of being executed) by one or more processors of a computer system, cause the computer system to perform operations described herein. In one embodiment, the set of non-transitory computer-readable storage media comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, in one embodiment, a non-transitory computer-readable storage medium stores instructions, and a main CPU executes some of the instructions and a graphics processor unit executes other of the instructions. Generally, in one embodiment, different components of a computer system have separate processors and different processors can execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
   identifying a variable from application source code;
   identifying, from the application source code, information associated with the variable;
   identifying, based at least in part on the information, a distributed resource for storing a value for the variable;
   automatically provisioning the distributed resource for storing the value; and
   as a result of executing a set of computer-executable instructions derived from the application source code, accessing the value from the distributed resource.

2. The computer-implemented method of claim 1, wherein identifying the variable from application source code comprises identifying the variable from source code associated with an application that executes as a set of components distributed among a plurality of computing devices.

3. The computer-implemented method of claim 1, wherein:
   computer-implemented method further comprises registering at least a portion of the information in an application namespace registry; and identifying the distributed resource is based at least in part on the portion registered.

4. The computer-implemented method of claim 1, further comprising generating and outputting the set of computer-executable instructions usable to allow access to the value via the distributed resource, wherein execution of the set of computer-executable instructions causes the value of the variable to be stored in the distributed resource.

5. The computer-implemented method of claim 1, wherein the information includes at least:
   a data type;
   a lexical scope; and
   a consistency condition that indicates a scope of convergence of a value of the variable.

6. The computer-implemented method of claim 5, wherein the information further includes a concurrency condition that indicates a scope of simultaneous access to the value of the variable.

7. A system, comprising:
   memory to store computer-executable instructions, which if performed by one or more processors, cause the system to at least:
   identify a variable from an application source code;
   identify a set of parameters associated with the variable;
   identify, based at least in part on the set of parameters, a distributed resource for storing a value for the variable;
   automatically provision the distributed resource for storing the value; and
   as a result of executing a set of computer-executable instructions derived from the application source code, access the value from the distributed resource.

8. The system of claim 7, wherein the computer-executable instructions further include instructions that cause the system to:
   receive a request to write the value of the variable; and
   cause the value of the variable to be stored in the distributed resource.

9. The system of claim 7, wherein the computer-executable instructions further include instructions that cause the system to:
   receive a request to read the value of the variable;
   access a repository to identify a storage location in the distributed resource for the value; and
   cause the value of the value to be read from the storage location.

10. The system of claim 7, wherein the set of parameters include a concurrent access condition.

11. The system of claim 10, wherein the set of parameters include a data consistency condition.

12. The system of claim 7, wherein:
   the variable is identified from compilation of application source code that results in a set of executable instructions; and
   the set of executable instructions are executed in a distributed manner by a plurality of host computing devices.

13. The system of claim 12, wherein:
   the distributed manner is that executable instructions of the set of executable instructions are deployed to a different host computing device from other executable instructions of the set of executable instructions; and
   the application source code includes notation that causes the executable instructions to be deployed to the different host computing device.

14. A non-transitory computer-readable storage medium that stores executable instructions, which, if executed by one or more processors of a computer system, cause the computer system to at least:
   identify a variable from an application source code;
   identify information associated with the variable;
   identify, based at least in part on the information, a distributed resource for storing a value for the variable;
   automatically provision the distributed resource for storing the value; and
   as a result of executing a set of computer-executable instructions derived from the application source code, access the value from the distributed resource.

15. The non-transitory computer-readable storage medium of claim 14, wherein the information indicates a data type, a lexical scope, and a concurrent access condition.

16. The non-transitory computer-readable storage medium of claim 14, wherein the information indicates a data type, a lexical scope, and a data consistency condition.

17. The non-transitory computer-readable storage medium of claim 14, wherein:
   the distributed resource is a first distributed resource; and
   the executable instructions further include executable instructions that cause the computer system to:
      identify, based at least in part on the information, a second distributed resource for storing the value; and
      automatically provision the second distributed resource for storing the value.

18. The non-transitory computer-readable storage medium of claim 14, wherein the executable instructions that cause the computer system to identify the information include instructions that cause the computer system to identify the information based at least in part on presence or absence of notation in source code that contains the variable.

19. The non-transitory computer-readable storage medium of claim 14, wherein the executable instructions include instructions that cause the computer system to:
   identify that the variable is no longer in use; and
   automatically erase the value from the distributed resource.

20. The non-transitory computer-readable storage medium of claim 19, wherein the executable instructions that cause the computer system to identify that the variable is no longer in use include instructions that cause the computer system to use reference counting to identify that the variable is no longer in use.

* * * * *